United States Patent
McClure

(10) Patent No.: US 12,085,103 B2
(45) Date of Patent: Sep. 10, 2024

(54) FASTENER AND METHOD FOR OPERATION OF SAID FASTENER

(71) Applicant: Centrix AeroSpace LLC, Kent, WA (US)

(72) Inventor: Travis McClure, Kirkland, WA (US)

(73) Assignee: CENTRIX AEROSPACE LLC, Kent, WA (US)

( * ) Notice: Subject to any disclaimer, the term of this patent is extended or adjusted under 35 U.S.C. 154(b) by 385 days.

(21) Appl. No.: 17/453,692

(22) Filed: Nov. 5, 2021

(65) Prior Publication Data
US 2022/0136549 A1 May 5, 2022

Related U.S. Application Data

(60) Provisional application No. 63/110,305, filed on Nov. 5, 2020.

(51) Int. Cl.
*F16B 13/04* (2006.01)
*F16B 19/10* (2006.01)

(52) U.S. Cl.
CPC .................. *F16B 19/109* (2013.01)

(58) Field of Classification Search
CPC .................................................. F16B 19/109
See application file for complete search history.

(56) References Cited

U.S. PATENT DOCUMENTS

| | | | | |
|---|---|---|---|---|
| 4,537,542 A * | 8/1985 | Pratt | ...................... | F16B 19/109 24/607 |
| 5,240,361 A * | 8/1993 | Armstrong | ............. | F16B 19/109 269/48.2 |
| 2005/0200066 A1* | 9/2005 | McClure | ............... | F16B 19/109 269/47 |
| 2013/0039716 A1* | 2/2013 | McClure | ............... | F16B 33/002 411/80.1 |
| 2016/0312815 A1* | 10/2016 | Bigot | ..................... | F16B 19/109 |
| 2018/0051729 A1* | 2/2018 | McClure | ................. | F16B 19/02 |
| 2021/0025424 A1* | 1/2021 | Brachet | ................. | F16B 19/109 |
| 2021/0207639 A1* | 7/2021 | McClure | ............. | F16B 13/0833 |

* cited by examiner

*Primary Examiner* — Gary W Estremsky
(74) *Attorney, Agent, or Firm* — McCoy Russell LLP

(57) ABSTRACT

A fastener is provided herein. The fastener includes, in one example, a block fixedly coupled to an interior spindle and mated with a slot in a threaded retaining spindle as well as a drive nut is threadingly engaged with the threaded retaining spindle and an unthreaded collet is coupled to the threaded retaining spindle. The fastener further includes a body that circumferentially surrounds the block and the threaded retaining spindle and the block, body, and threaded retaining spindle of the fastener are configured to axially translate in relation to one another and are substantially prevented from rotation in relation to one another, during different stages of fastener operation.

19 Claims, 10 Drawing Sheets

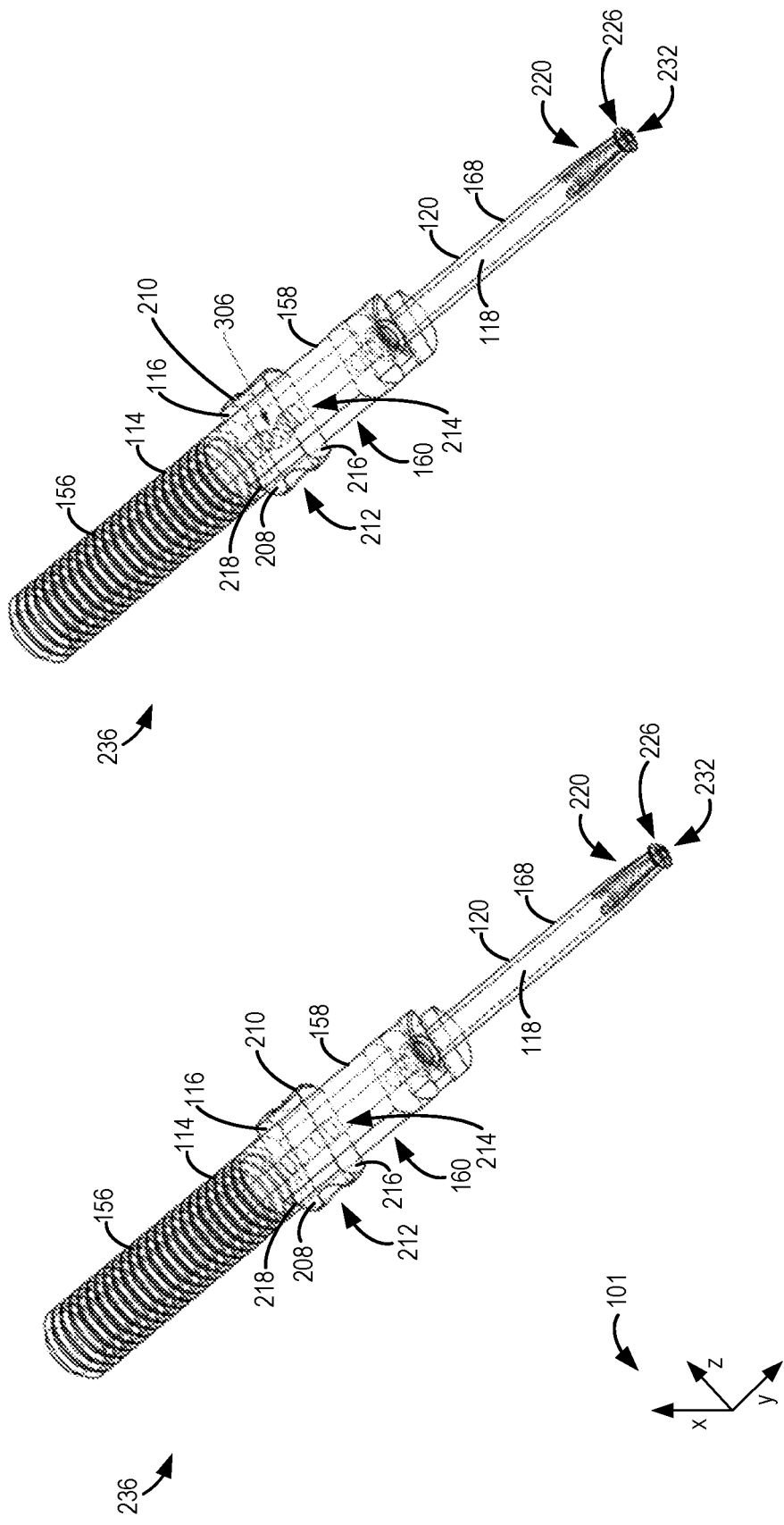

FASTENER AND METHOD FOR OPERATION OF SAID FASTENER

CROSS-REFERENCE TO RELATED APPLICATION

The present application claims priority to U.S. Provisional Application No. 63/110,305, entitled "FASTENER AND METHOD FOR OPERATION OF SAID FASTENER," filed Nov. 5, 2020. The entire contents of the above-referenced application are hereby incorporated by reference in its entirety for all purposes.

FIELD

The present description relates generally to a fastener designed to clamp workpieces and a method for operation of the fastener.

BACKGROUND AND SUMMARY

Many manufacturing fields use fasteners, such as blind fasteners, for securing two objects to one another when, for example, only one side of a joint is accessible. The aerospace and other industries utilize blind fasteners in a variety of manufacturing capacities such as fuselage manufacture, floor panel assembly, and the like. Previous blind fastener designs include rods that thread into collets with clamping feet radially expanded by the rods. When expanded, the clamping feet slide under a lower workpiece and act as a lower clamping arm, while, for example, a surface in the body of the fastener, acts as an upper clamping arm that engages an upper workpiece.

However, the inventor has recognized several drawbacks with previous removable fasteners. For instance, in certain types of fasteners, as the fastener's grip length is decreased, the collet retracts into a housing but the rod protrudes from the distal end of the collet and in some cases the rod's position may remain relatively stationary with regard to the housing. Consequently, prior fasteners may pose installation challenges in spaced constrained environments. The inventor has also recognized drawbacks in other fasteners with regard to fastener packaging and load carrying capabilities.

Facing the aforementioned challenges, the inventor developed a fastener to a least partially overcome some of the challenges. In one example, the fastener includes a block fixedly coupled to an interior spindle and mated with a slot in a threaded retaining spindle. The fastener further includes a drive nut engaged with the threaded retaining spindle. The fastener also includes an unthreaded collet coupled to the threaded retaining spindle and including a plurality of flexible legs each including a clamping foot. The fastener even further includes a body that circumferentially surrounds the block and the threaded retaining spindle. The block, the body, and the threaded retaining spindle of the fastener are configured to axially translate in relation to one another and are substantially prevented from rotation in relation to one another, during different stages of fastener operation. In this way, the fastener can achieve a "double" axial translation and anti-rotation functionality. The "double" axial translation and anti-rotation functionality can allow the fastener's overall length to be decreased as its grip length is decreased. The compactness of the fastener is increased as a result, allowing the fastener to be deployed in more space constrained environments, if desired.

In one example, the unthreaded collet may be axially captured in the slot in the threaded retaining spindle. In this way, the unthreaded collet may be positioned in a desired axial location and axial load may be transferred through the unthreaded collet to the threaded retaining spindle.

Further, in one example, in an initial stage of clamp-up, rotation of the drive unit in a first direction by a first amount drives the threaded retaining spindle in an axial direction. In one example, the threaded retaining spindle may be rotationally constrained by the cooperation of inner surfaces of the body and exterior surfaces of the block, and by the block being axially mated within the slot of the threaded retaining spindle. Translation of threaded retaining spindle in relation to the unthreaded collet to urge clamping feet of the unthreaded collet outward into a "clamping" configuration.

In such an example, once the clamping feet are in the "clamping" configuration, additional rotation of the drive nut in the first direction causes the block, interior spindle, and threaded retaining spindle to axially retract into the body in unison. Consequently, the interior spindle can be drawn into the body of the fastener once the clamping feet have been expanded, thereby increasing the fastener's space efficiency.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present disclosure will be better understood from reading the following description of non-limiting embodiments, with reference to the attached drawings, wherein below:

FIGS. 3A-3B are perspective views of another stage of assembly of the assembled components of FIG. 2;

FIGS. 1-13B are drawn approximately to scale, however other relative component dimensions may be used in other embodiments.

DETAILED DESCRIPTION

Figure 1:
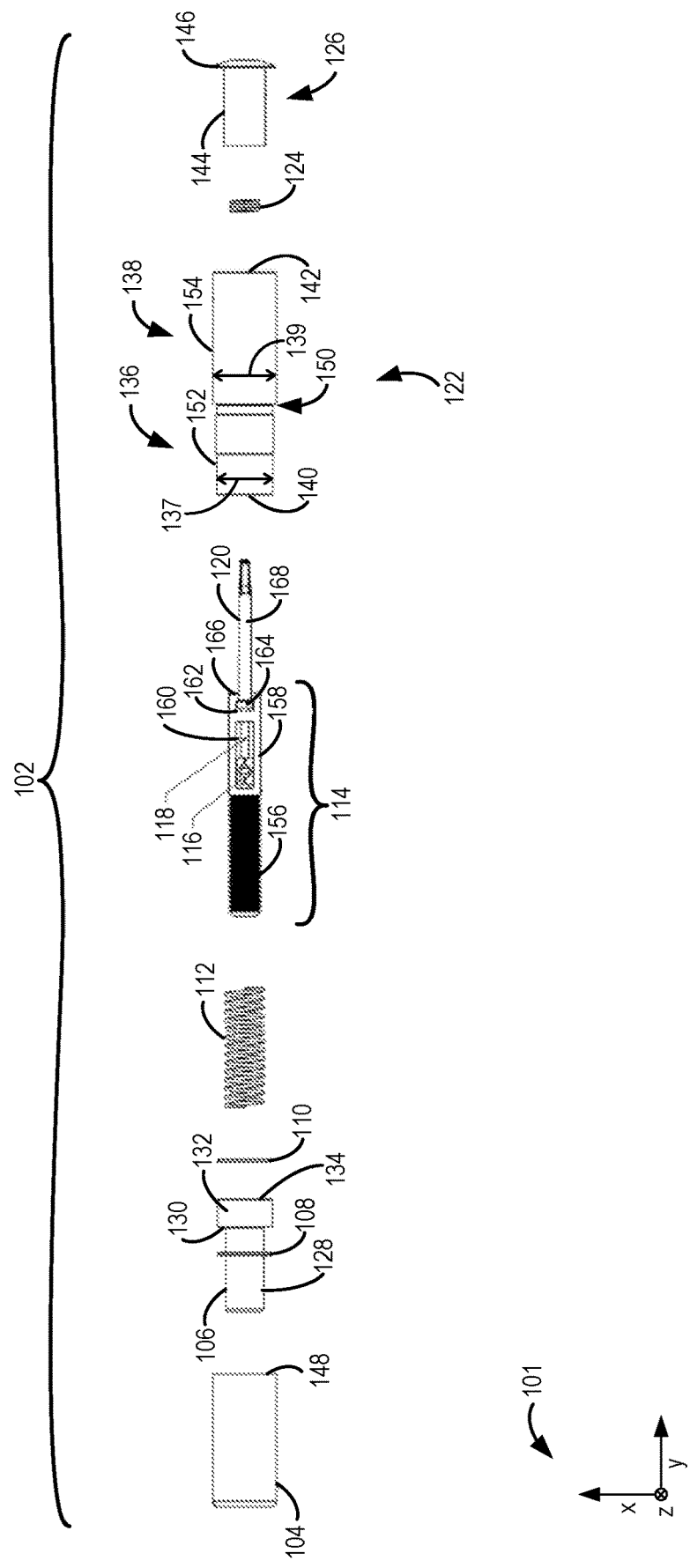
FIG. 1 is an exploded side view of an example fastener.

The following description relates to a removable fastener with an unthreaded collet that may be used secure two objects to one another, more specifically the fastener may be used to secure the two objects to one another when only one side of the joint is accessible (e.g., the fastener may be used as a blind fastener). In one example, the fastener may include a block coupled to an interior spindle (e.g., center spindle), a threaded retaining spindle that has a slot which retains the unthreaded collet, and a body. In such an example, the block, interior spindle, and threaded retaining spindle are designed with "double" axial translation and anti-rotation functionality, allowing the components to axially translate in relation to one another while rotation between the block and the threaded retaining spindle is substantially prevented, during different stages of clamping/unclamping in the fastener. In other words, the block, the body, and the threaded retaining spindle of the fastener are configured to axially translate in relation to one another and are substantially prevented from rotation in relation to one another, during different stages of fastener operation. The "double" axial translation/anti-rotation feature allows the fastener's overall length to be decreased as its grip length is varied during clamping, increasing the fastener's space efficiency. Other features, aspects, and advantages of the fastener will become apparent in the following description.

In one example, in an initial stage of clamp-up, rotation of the drive nut threadingly drives the threaded retaining spindle in an axial direction. Further, in the initial clamp-up stage, the threaded retaining spindle may be rotationally constrained by the cooperation of the inner surfaces of the body and exterior surfaces of the block, and by the block being axially mated within the slot of the threaded retaining spindle. Additionally, the centerline alignment may be facilitated by the cooperating surfaces of said features and also by an interior spindle that may be fixed center. To elaborate, rotation of the drive nut in a first direction by a first rotational amount causes a corresponding axial translation of the threaded retaining spindle and the collet trapped within by a first axial translation amount. A spring (surrounding the threaded retaining spindle) located between the drive nut and the block may urge the block against its resting stop throughout the threaded retaining spindle's first axial translation. The threaded retaining spindle may axially translate with respect to the block as the slot of the threaded retaining spindle may be sized to accommodate the size of the block and the first axial translation. Fixedly linked to the block may be the center spindle. The center spindle may fit within corresponding center holes in the threaded retaining spindle and collet. As the block is urged to maintain its first position throughout the threaded retaining spindles first axial motion, the center spindle may maintain its original position. As the threaded center spindle is axially drawn throughout its first axial motion, the collet may be held therein. In such a construct, the collet via the connection to the threaded retaining spindle may be pulled over the center spindle which may be held stationary via its connection to the block. As such, the sizing of these interacting components can facilitate the fingers of the collet being fully opened by the center spindle at the end of the threaded retaining spindle's first axial translation. Additionally, the sizing of these interacting components may be such that once the collet legs are fully opened, the block may axially engage with the threaded retaining spindle and begin to axially transverse up the body (overpowering the urging of the spring and thus compressing the spring). However, other spring designs have been contemplated.

Figure 2:
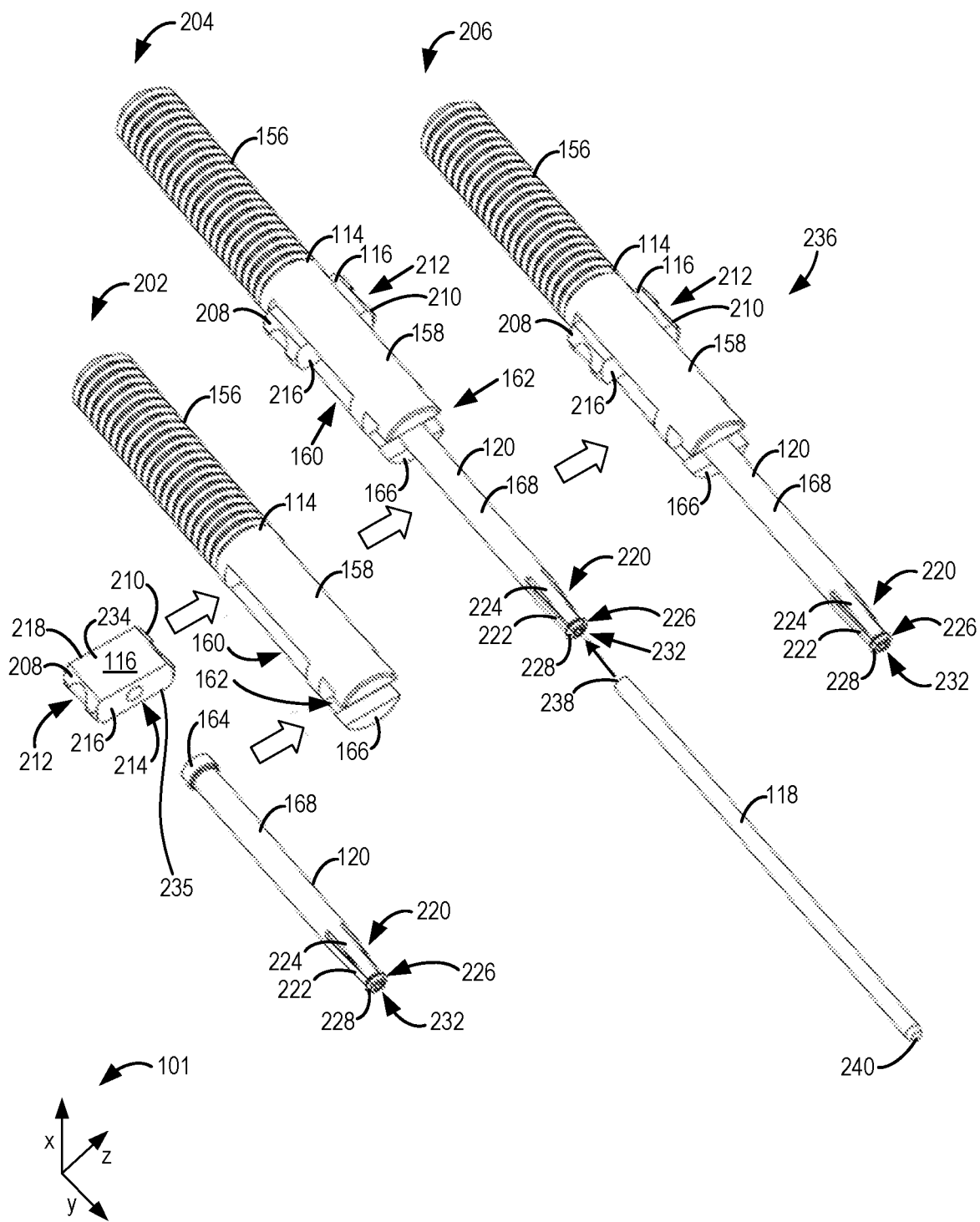
FIG. 2 is a perspective view of three different stages of assembly of some of the components in the fastener depicted FIG. 1.
Figure 6:
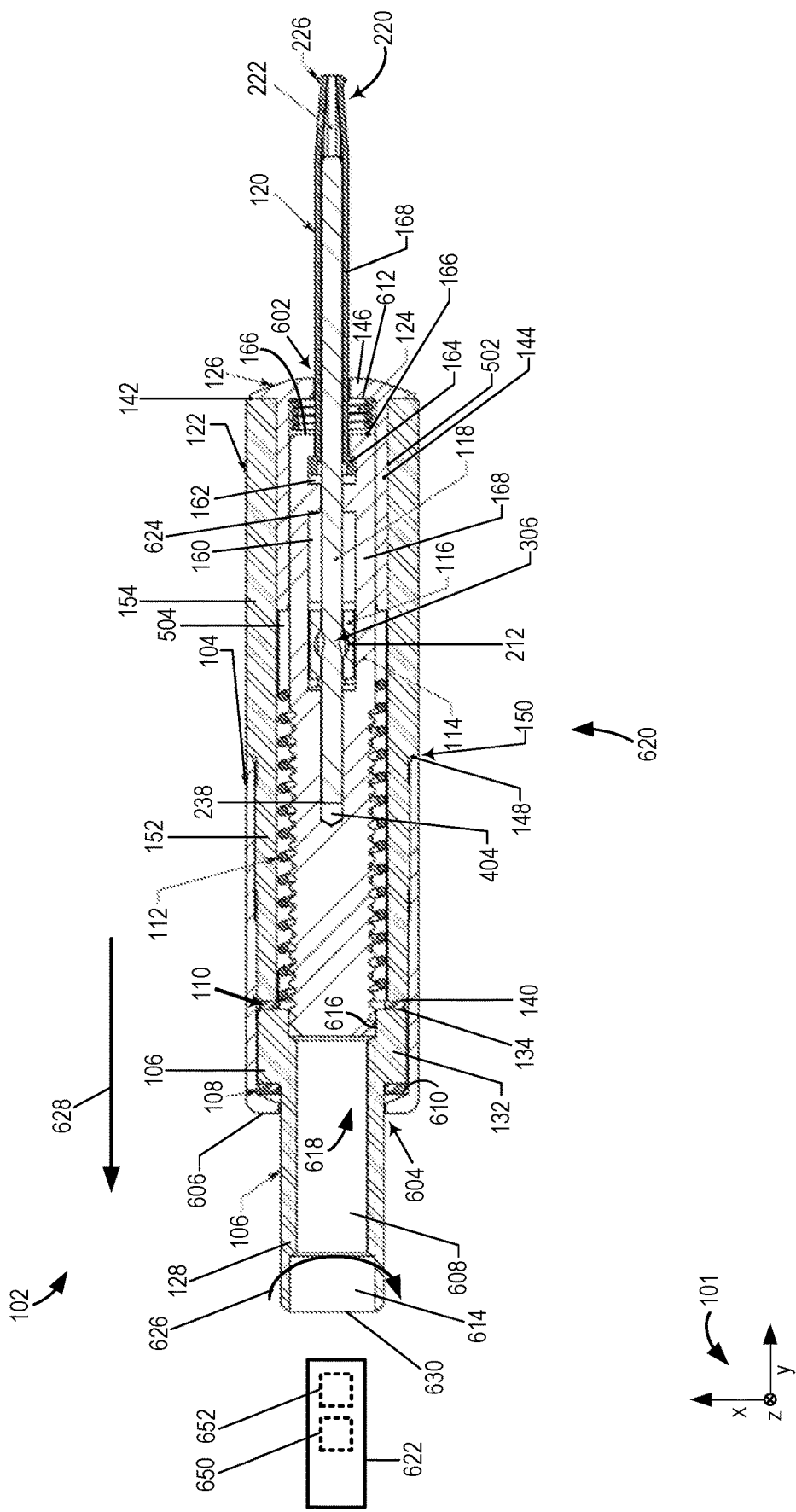
FIG. 6 is a cross-sectional view of the assembled fastener of FIG. 1.
Figure 7:
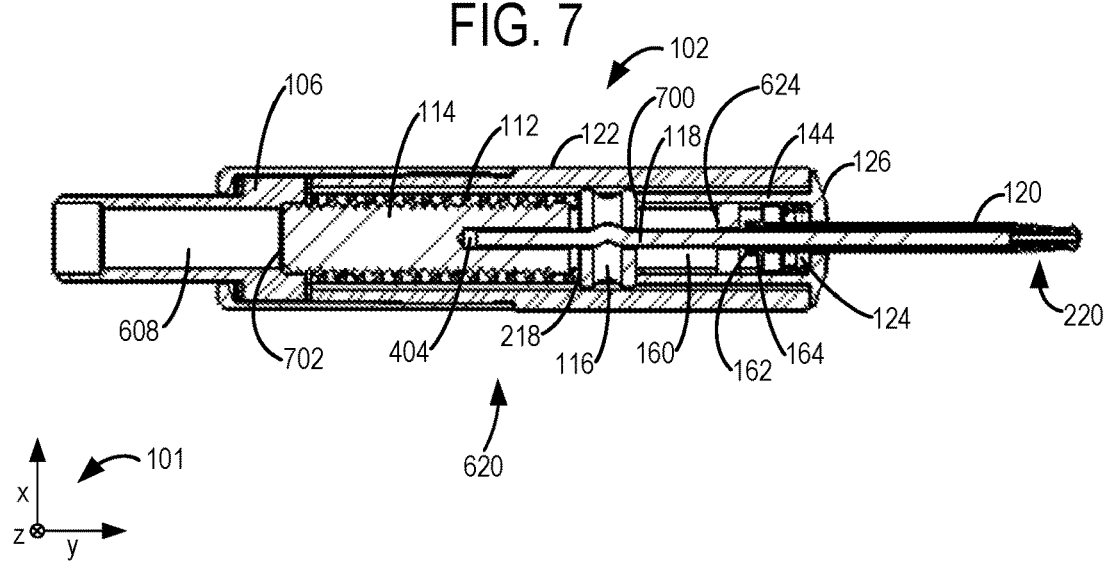
FIG. 7 is cross-sectional view of the fastener of FIG. 6 when the fastener is in a "ready to install" configuration.
Figure 8:
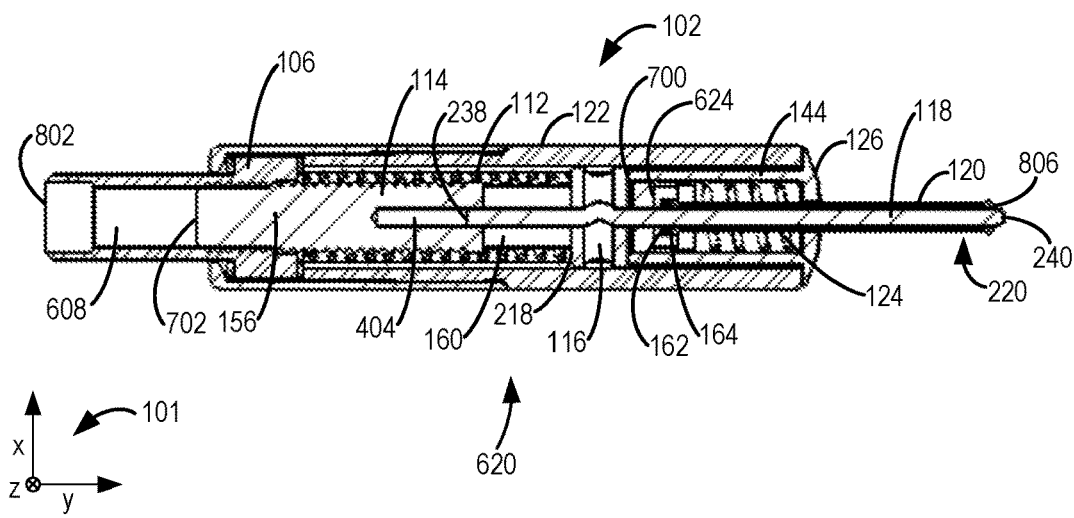
FIG. 8 is a cross-sectional view of the fastener of FIG. 6 when the fastener is in a "ready to clamp" configuration.
Figure 9:
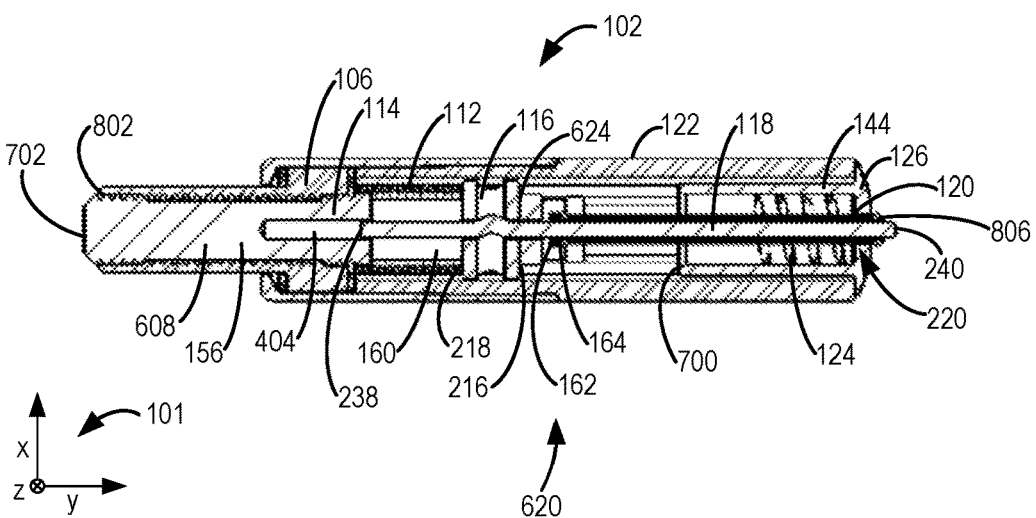
FIG. 9 is a cross-sectional view of the fastener of FIG. 6 when the fastener is in a "clamped" configuration.
Figure 10:
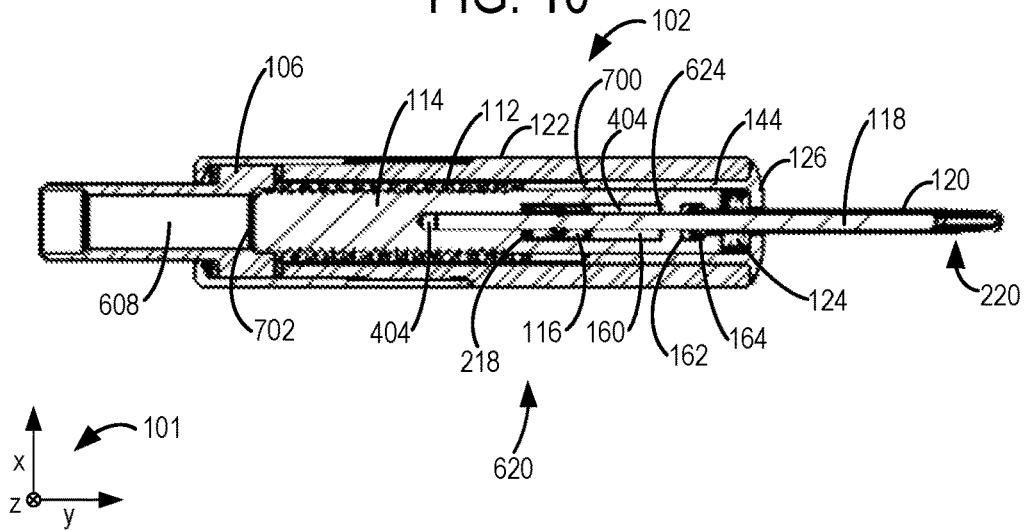
FIG. 10 is a cross-sectional view of the fastener of FIG. 6 when the fastener is in a "ready to install" position.
Figure 11:
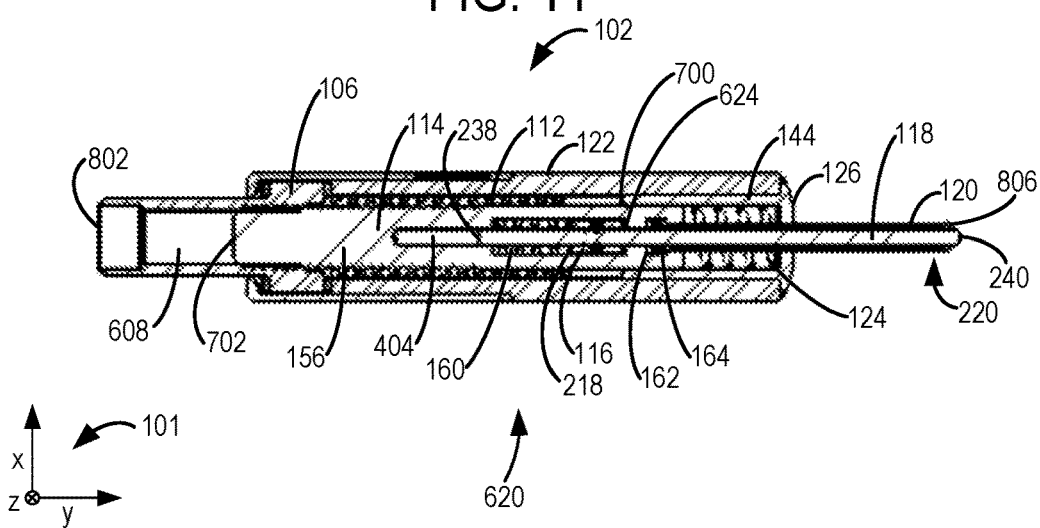
FIG. 11 is a cross-sectional view of the fastener of FIG. 6 when the fastener is in a "ready to clamp" configuration.
Figure 12:
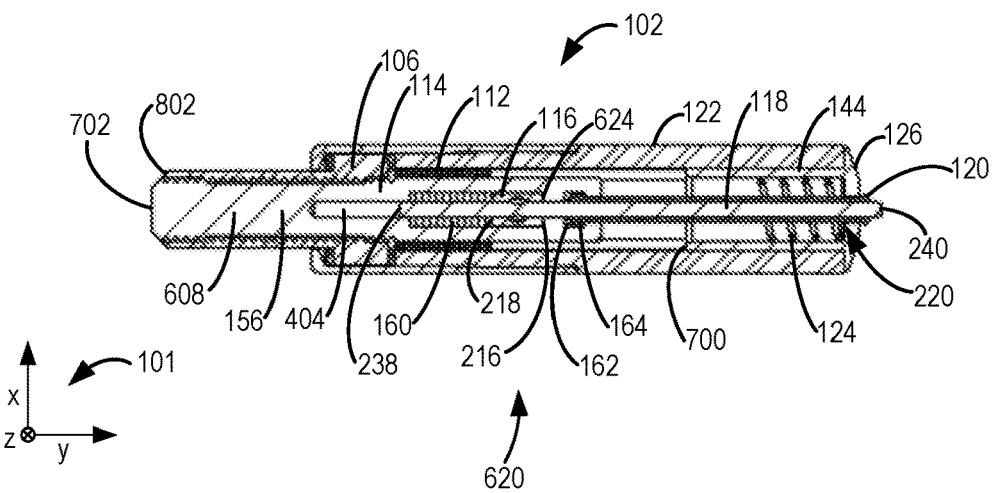
FIG. 12 is a cross-sectional view of the fastener of FIG. 6 when the fastener is in a "clamped" configuration.
Figure 13A:
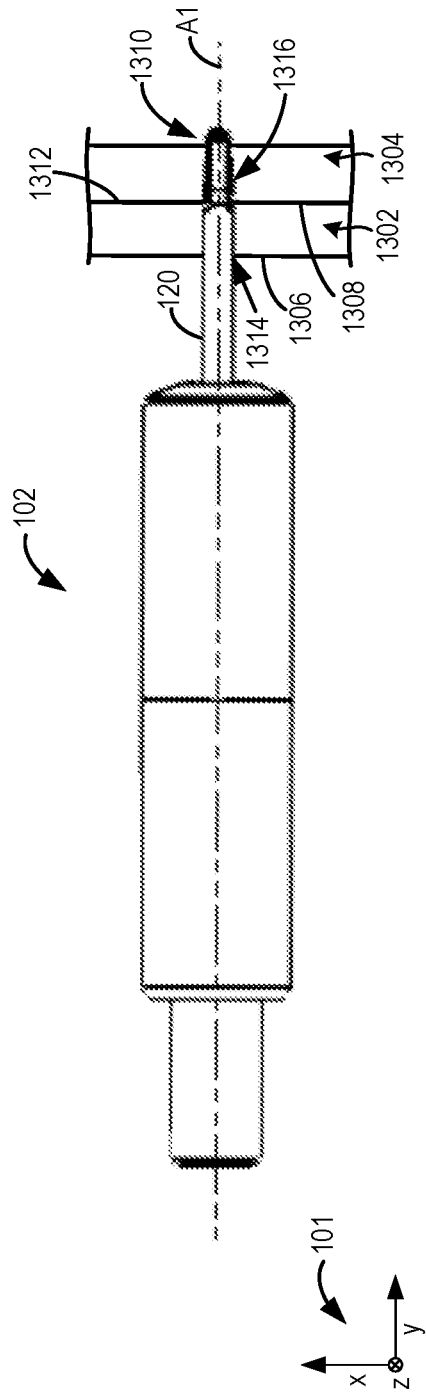
FIG. 13A is a side view of the assembled fastener of FIG. 6 installed within two objects prior to fastening the two objects together.
Figure 13B:
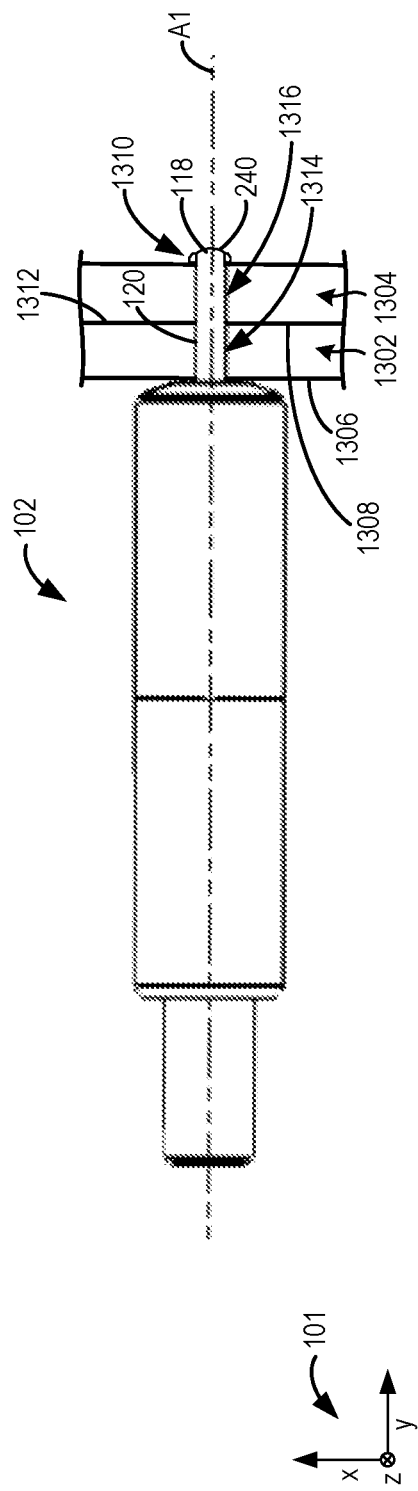
FIG. 13B is a side view of the fastener and the two objects of FIG. 13A after the two objects have been fastened together via the fastener.
Figure 14:
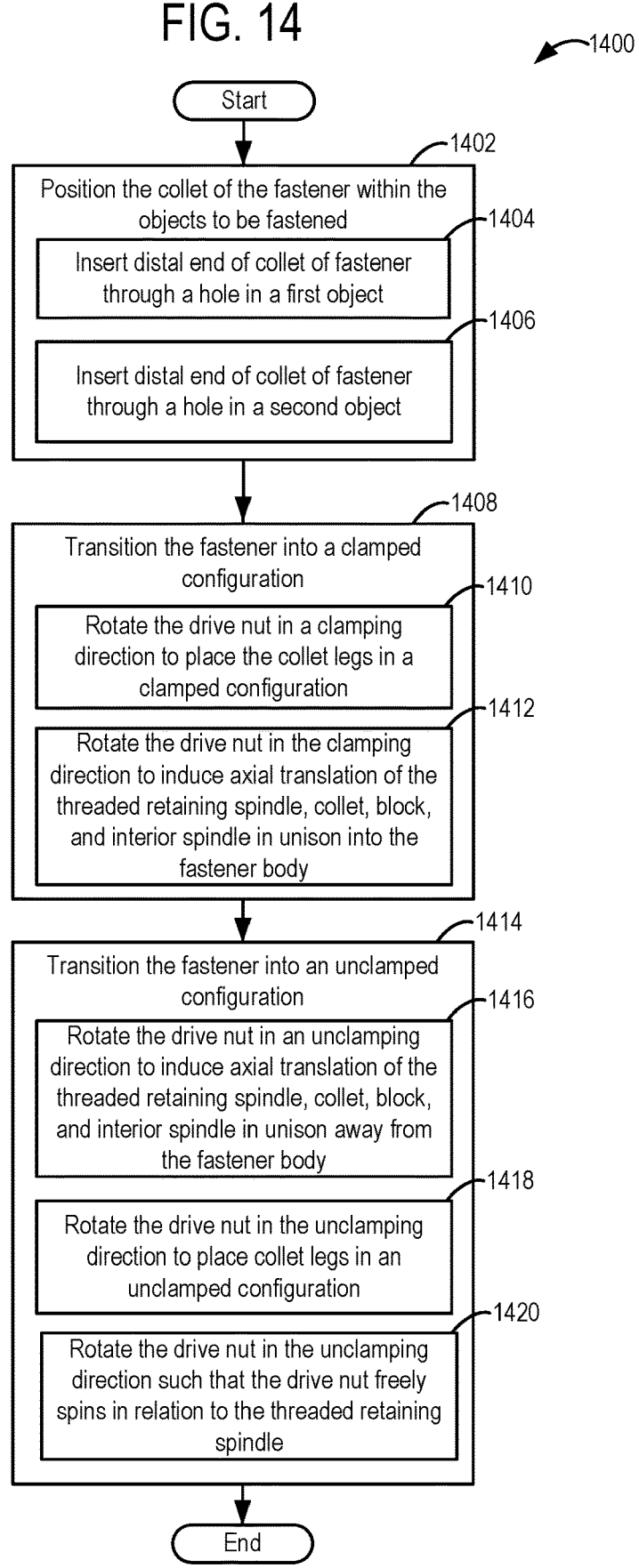
FIG. 14 is a flow chart of a method for operating a fastener according to the embodiments disclosed herein.

FIG. 1 is an exploded view of an example fastener according to the embodiments disclosed herein. FIGS. 2 and 3 depict different stages of assembly of the fastener. FIGS. 4A-4D show different views of the assembled components of FIGS. 2 and 3A-3B. FIGS. 5A and 5B show different views of the assembled components of FIGS. 2 and 3 partially inserted into a portion of a body of the fastener. FIG. 6 depicts a cross-sectional view of the assembled fastener. Cross-sectional views of the fastener in a "ready to install" configuration are shown in FIGS. 7 and 10. Cross-sectional views of the fastener in a "ready to clamp" configuration are shown in FIGS. 8 and 11. Cross-sectional views of the fastener in a "clamped" configuration are shown in FIGS. 9 and 12. FIGS. 13A and 13B depict the fastener clamping two objects together. FIG. 14 is a flow chart of a method for operating the fastener according to the embodiments disclosed herein.

A set of reference axes 101 are provided in FIGS. 1-13B for comparison between views shown, indicating a y-axis, a z-axis, and an x-axis. In some examples, the y-axis may be a vertical axis (e.g., parallel to a gravitational axis) and the z-axis may be a lateral axis. However, the axes may have other orientations, in other examples.

Turning now to FIG. 1, an exploded side view of components of an example fastener 102 according to the embodiments disclosed herein is illustrated. The function of these components of the fastener 102 is described in further detail with respect to FIGS. 2-14, with FIGS. 2-4 depicting how the components are assembled within the fastener 102. The fastener 102 may include a body (see FIG. 6) that houses the internal components of the fastener 102. In some embodiments, the body may be an assembly comprised of a first end cap 104, a center section 122, and a second end cap 126. The center section 122 of the body may be a hollow tube-like structure comprised of two outer portions that have different diameters. A first outer portion 136 may include a first section 152 that may extend from a first end 140 of the center section. A second outer portion 138 may include a second section 154 that extends from a second end 142 of the center section 122 and terminates at a point 150 in face-sharing contact with the first section 152. A diameter 137 of the first outer portion 136 may be smaller than a diameter 139 of the second outer portion 138. The interior cavity of the center section 122 may have one diameter that spans the length of the center section 122 (e.g., the internal cavity may have the same dimensions in both the first and second sections of the center section 122). The interior cavity may be of suitable dimensions where a tubed portion 144 of the second end cap 126 may be inserted into the second section 154 of the center section 122 at the second end 142 so that the outer edges of a top 146 of the second end cap 126 may be in flush, face-sharing contact with the second end 142 after insertion.

The outer dimensions of the first end cap 104 designed to mate with an interior opening of the center section 122, in one example. To elaborate, in some instances, the first end cap 104 may be of suitable dimensions where the first end 140 of the center section 122 may be inserted into a first face 148 of the first end cap 104 so that the first section 152 of the center section 122 is housed within the first end cap 104 and the first face 148 is in flush, face-sharing contact with the second outer portion 138 of the center section 122. However, other configurations of the fastener body have been contemplated. In some embodiments, the internal components of the fastener 102 may be assembled (as further described with respect to FIGS. 2 and 3) and inserted within the interior cavity of the center section 122 of the body and the two end caps (e.g., the first end cap 104 and the second end cap 126) may be mechanically grounded to the center section 122 so that both ends of the body of the fastener 102 are sealed. For example, the first end cap 104 may be mechanically grounded to the first end 140 of the center section 122 and the second end cap 126 may be mechanically grounded to the second end 142.

In other embodiments, the body assembly may not include the first end cap 104. For example, the first end cap 104 and the center section 122 may be jointly constructed (e.g., constructed as a monolithic structure). Further, in some examples, the center section 122 may be enlarged (e.g., to accommodate the internal components of the fastener 102) and constructed (e.g., cast (die cast), machined, etc.) to include a cap on the first end 140 so that the body assembly may include the capped center section and the second end cap 126. The end cap 126 may be a monolithic structure that may be die cast, for instance. In one example, the center section 122 may be die cast with all of the internal and external features in place, then the interior components may be installed, and then the end of the center section 122 may be swaged to capture the interior fastener components. A retaining ring may be added to the proximal end of the capped center section (e.g., within the interior cavity of the center section 122 just inside of the first end 140) so that the internal components of the fastener may be held in a secured position. In additional embodiments, the center section 122 of the body may be enlarged to accommodate the internal components of the fastener 102 and the first end 140 deformed to secure the components in position at final assembly, thus eliminating the need for a proximal cap or a proximal retaining ring, if wanted. In some embodiments, the body of the fastener 102 may be constructed out of a metal such as steel, aluminum, titanium, etc. However, in other embodiments, the body may be constructed out of a polymer or a combination of materials.

In addition to housing the first section 152 of the center section 122, the inner cavity of the first end cap 104 may be of suitable dimensions to accommodate a drive nut 106. The drive nut 106 may include a shaft 128 fixedly attached to a first surface 130 of a section 132. The threaded internal surface of the drive nut 106 may accommodate a threaded portion 156 of a threaded retaining spindle 114. The threaded retaining spindle 114 may further include a non-threaded portion 158 that contains a first slot 160 and a second slot 162. The first slot 160 and the second slot 162 may be of suitable dimensions to accommodate the lateral insertion (e.g., parallel to the z-axis) of a block 116 and an enlarged head 164 as well as a portion of a shank 168 of an unthreaded collet 120, respectively. The slots 160 and 162, block 116, and unthreaded collet 120 are shown and described in further detail with respect to FIGS. 2 and 3. The threaded retaining spindle may include an opening 404, shown in FIG. 4B, configured to mate with an unthreaded interior spindle described in greater detail herein. The opening 404 may axially extend through the threaded retaining spindle 114 at a first face 166 located on the non-threaded portion 158 and terminate within the threaded portion 156 (see at least FIG. 4B). The opening 404 may be of suitable dimensions to accommodate an unthreaded interior spindle 118 that may be inserted into and through the unthreaded collet 120 as further described below.

Continuing with FIG. 1, the fastener 102 may include a first washer 108 be positioned around the shaft 128 of the drive nut 106 (e.g., the diameter of an inner aperture of the first washer may be larger than the outer diameter of the shaft 128). The fastener 102 may include a second washer 110 adjacent to a second face 134 on the section 132 of the drive nut 106 and an inner aperture may accommodate the threaded retaining spindle 114. The fastener 102 may further include a free-spin spring 124 and a spreader spring 112. The spreader spring 112 may fit in the space existing between the internal faces of the body and the external faces of the threaded retaining spindle 114 and pushes on one end against the drive nut 106 (or the washer next to the drive nut) and on the other end against the top or proximal end of the block 116. As shown in FIG. 5B, the outer edges of the block 116 may directly interact with the internal faces of the body such that no spring may slip past. Further, as shown in FIG. 6 the spreader spring 112 may touch the drive nut 106 or the washer 110 on one end and on the other end located at the top or proximal end of the block 116.

In an initial portion of fastener clamp-up, rotation of the drive nut 106 in a first direction by a first rotational amount may cause a corresponding axial translation of the threaded retaining spindle 114 and the collet 120 which may be trapped within by a first axial translation amount. The spreader spring 112 (surrounding the threaded retaining spindle) located between the drive nut 106 and the block may urge the block against its resting stop throughout the threaded retaining spindle's first axial translation.

Turning now to FIG. 2, a view of three different stages during the assembly of the fastener 102 of FIG. 1. A first assembly stage 202 shows how the block 116 and the unthreaded collet 120 may be laterally inserted into the threaded retaining spindle 114. A second assembly stage 204 shows how the interior spindle 118 may be inserted into the threaded retaining spindle 114 after lateral insertion of the block 116 and the unthreaded collet 120. A third assembly stage 206 shows the threaded retaining spindle 114, the unthreaded collet 120, the block 116, and the interior spindle 118 in an assembled configuration (as shown in FIG. 1). The block 116 may be symmetrically shaped with two beveled sides (a first side 208 and a second side 210). A first aperture 212 may laterally (e.g., parallel to the z-axis) traverse the block 116 through the middle of the first side 208 and the second side 210. A second aperture 214 may traverse the center of the block 116 through a third side 216 and a fourth side 218. The first aperture 212 and/or second aperture 214 may be configured as lateral access slots. The access slot may have a deformed (e.g., bent) portion of the spindle 118 residing therein, which is discussed in greater detail herein.

The block 116 may be configured for lateral insertion into the first slot 160 of the threaded retaining spindle 114. To elaborate, the block 116 may be inserted into the first slot 160 until the second aperture 214 is aligned with a central axis (in the opening of the threaded retaining spindle 114.

The length (e.g., parallel to the y-axis) of the block 116 may be less than the length of the first slot 160 of the threaded retaining spindle 114 to allow axial translation therein. The width (e.g., parallel to the z-axis) of the block 116 may be greater than the diameter of the threaded retaining spindle 114 where, after insertion, the beveled sides may extend laterally beyond the outer perimeter of the threaded retaining spindle 114 (e.g., the sides 208 and 210 (e.g., beveled sides) of the block 116 as well as a portion of the side surfaces 234, 235 and the third side 216 (e.g., bottom surface) may protrude from the first slot 160 of the threaded retaining spindle 114 along the z-axis). The side surface 234 and side surface 235 may be contoured as opposing faces. Further, the fourth side 218 (e.g., top surface) and the third side 216 (e.g., bottom surface) may be contoured as opposing faces (e.g., planar faces).

The unthreaded collet 120 may include a shank 168 fixedly attached to the enlarged head 164, with a continuous interior cavity running through both components. The interior cavity may be parallel and aligned to a central axis (e.g., parallel to the y-axis) of the unthreaded collet 120. An end of the shank 168 opposite the enlarged head 164 may include a plurality of flexible legs 220 connected to a plurality of clamping feet 226. The plurality of flexible legs 220 may include a first leg 222, a second leg 224, and so on around the outer diameter of the shank 168. The legs may extend axially from the shank 168, with a slot formed between each adjacent leg of the plurality of flexible legs 220. Each leg of the plurality of flexible legs 220 may include a clamping foot, thereby forming the plurality of clamping feet 226. For example, the first leg 222 may include a first clamping foot 228, the second leg 224 may include a second clamping foot, and so on.

When the unthreaded collet 120 is axially translated is a first direction, the plurality of clamping feet 226 may be radially retracted. The radially retracted clamping feet diameter may be designed to retract to a diameter at or below the shank diameter of the collet 120. Specifically, in one example, the diameter of the central slot 232 may be smaller than the diameter of the interior cavity of the unthreaded collet 120. However, other relative sizes of these diameters may be used, in other examples. As the plurality of flexible legs 220 are attached the plurality of clamping feet 226, the plurality of flexible legs 220 may angle inward (e.g., relative to the shank 168) towards the central slot 232 in a closed position when the plurality of clamping feet 226 are radially retracted (e.g., the slots formed between adjacent legs may taper towards the central slot 232), allowing the unthreaded collet to be inserted into workpiece openings. When the unthreaded collet 120 is axially translated is a second direction. In one example, as the plurality of clamping feet 226 are spread apart, the ends of the plurality of flexible legs 220 attached to the plurality of clamping feet 226 may also be spread apart so that the legs may be substantially axially aligned with the shank 168 and be in an open position (e.g., the legs and the shank 168 may form a straight line along the y-axis).

The enlarged head 164 and a portion of the shank 168 adjacent to the enlarged head 164 may be laterally inserted into the second slot 162 of the threaded retaining spindle 114 so that the interior cavity of the unthreaded collet 120 may be aligned with a central axis (e.g., parallel to the y-axis) and the opening of the threaded retaining spindle 114 as well as the second aperture 214 of the block 116. After insertion, the shank 168 of the unthreaded collet 120 may extend away from the first face 166 along the y-axis, with a portion of the shank 168 outside of the threaded retaining spindle 114.

Further in one example, the interior cavity of the unthreaded collet 120, the opening of the threaded retaining spindle 114, and the second aperture 214 of the block 116 may be concentric and in some cases may have similar dimensions, where the dimensions may accommodate insertion of the interior spindle 118. Insertion of the interior spindle 118 may occur in the second assembly stage 204 of assembly after the first assembly stage 202 has been completed (e.g., the block 116 and the unthreaded collet 120 have been laterally inserted into the threaded retaining spindle 114). In the second assembly stage 204, the plurality of clamping feet 226 of the unthreaded collet 120 may be adjusted to an open position. In the open position, a first end 238 of the interior spindle 118 may be inserted through the central slot 232 and into the shank 168, along the central axis of the threaded retaining spindle 114. The length of the interior spindle 118 may be inserted through the central slot 232 so that a second end 240 the interior spindle 118 is within the unthreaded collet 120. During insertion, the interior spindle 118 may pass through one or more openings in the proximal end of the threaded retaining spindle 114 and into or through the second aperture 214 of the block 116 and may extend into opening 404 of the threaded retaining spindle 114 (see at least FIG. 4B) as shown in the third assembly stage 206. Specifically, the threaded retaining spindle may include two center holes (or openings) along the long axis of the spindle. One hole may be between the collet slot and the block slot and the other hole may extend at least partially from the block slot towards the proximal end. The first hole allows the interior spindle 118 to extend from the unthreaded collet into the block where it may be fixedly attached. The second hole may be optionally included in the fastener and may be helpful from an engineering standpoint as it can provide stability and may help the parts maintain a smooth action along the centerline. The third assembly stage 206 shows the threaded retaining spindle 114, the unthreaded collet 120, the block 116, and the interior spindle 118 in an assembly 236 (e.g., after the first assembly stage 202 and the second assembly stage 204 have been completed).

Once the assembly 236 has been formed using the previously mentioned assembly steps, the interior spindle 118 may be axially (e.g., parallel to the y-axis) linked (e.g., fixedly coupled) to the block 116 as shown in FIGS. 3A-3B. FIG. 3A-3B are side perspective views of the assembly 236 with the interior of the assembly 236 shown in phantom. By linking or fixedly attaching the interior spindle 118 to the block 116, the interior spindle 118 and the block 116 may move in unison within the first slot 160 (e.g., along the y-axis, parallel to the central axis of the interior spindle 118) of the interior spindle 118. In some embodiments, the interior spindle 118 may be axially linked to the block 116 by deforming a portion of the interior spindle 118 housed within the block 116 in the assembly 236. The interior spindle 118 may be located within the shank 168 of the unthreaded collet 120, the second aperture 214 of the block 116, and the opening (see at least FIG. 4B) of the threaded retaining spindle 114 after being inserted through the central slot 232 of the unthreaded collet 120 as described with respect to FIG. 2. The portion of the interior spindle 118 residing within the second aperture 214 of the block 116 (e.g., in between the third side 216 and the fourth side 218) may be deformed by inserting a deforming tool (e.g., a punch tool or other suitable tool) into the first aperture 212 of the block 116. The deforming tool may be inserted into the first aperture 212 through the first side 208 or the second side 210. After deformation, the portion of the interior spindle 118 residing within the second aperture 214 of the block 116 may no longer be straight (e.g., parallel with the y-axis) as shown in FIG. 3B. A deformed portion 306 of the interior spindle 118 residing within the second aperture 214 may have a kink or indentation that locks the interior spindle 118 to the block 116. The deformed portion 306 may prevent the interior spindle 118 from sliding axially within the second aperture 214 of the block 116 and with respect to the block 116. Thus, after the block 116 and the interior spindle 118 may axially translate as a unit. In some embodiments, the interior spindle 118 may be linked (e.g., fixedly attached) within the second aperture 214 of the block 116 by another suitable technique (e.g., welding, mechanical attachment (e.g., bolting or clamping), combinations thereof, and the like).

Figure 4A:
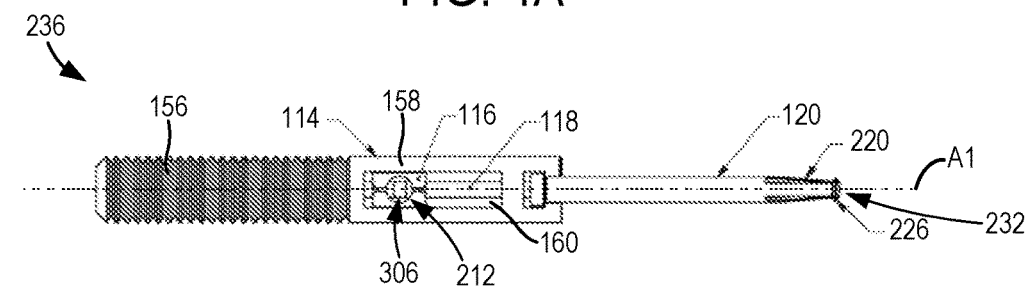
FIG. 4A is a side view of the assembled components of FIGS. 3A-3B.
Figure 4B:
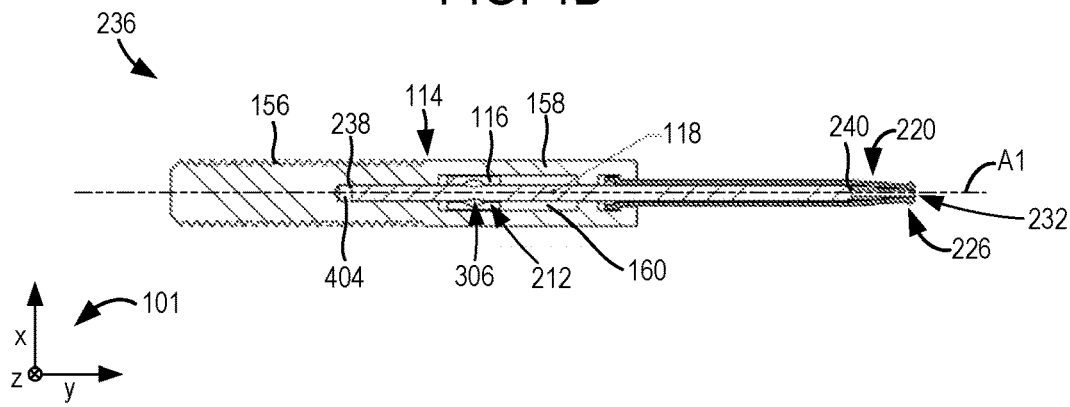
FIG. 4B is a cross-sectional view of the assembled components depicted in FIG. 4A.
Figure 5A:
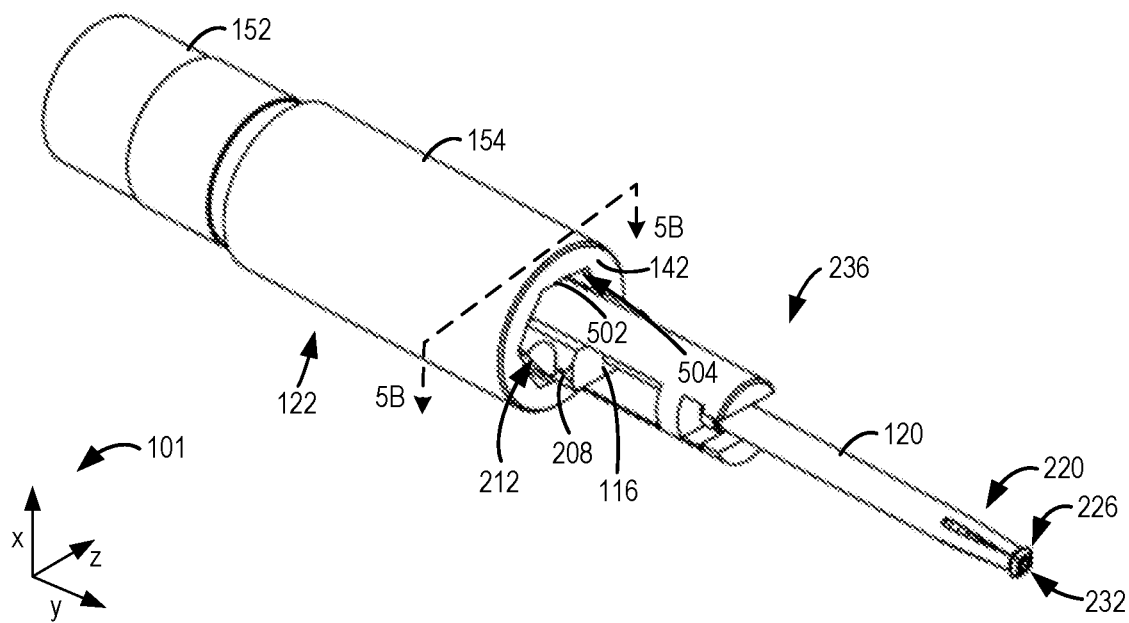
FIG. 5A is a side perspective view of the assembled components of FIGS. 3A-3B partially inserted into a portion of a body of the fastener depicted in FIG. 1.
Figure 5B:
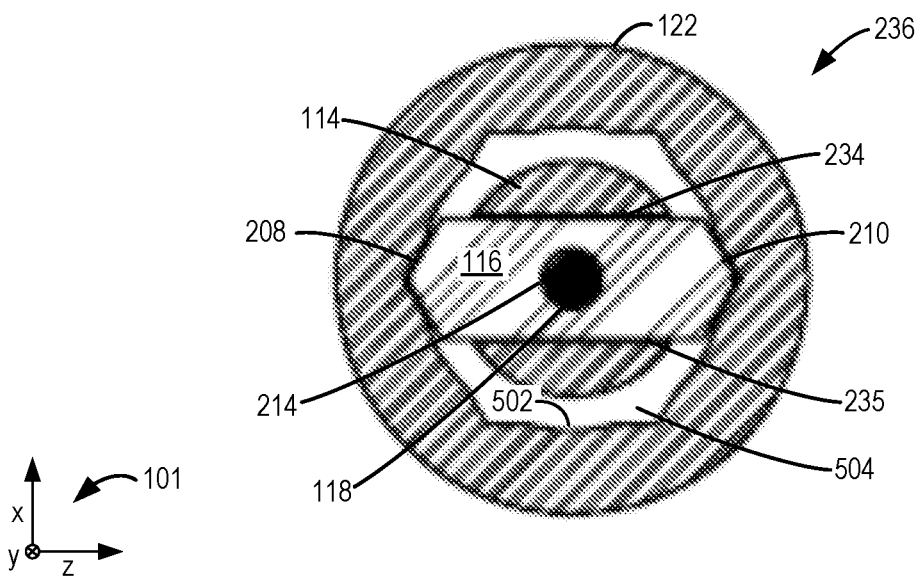
FIG. 5B is a cross-sectional view of the fastener depicted in FIG. 5A.

FIGS. 4A, 4B, 5A, and 5B show different views of the assembly 236 including the deformed portion 306 that may axially link the interior spindle 118 to the block 116. FIG. 4A shows a side view of the assembly 236 along the y-axis. An axis A1 may define the central axis of the assembly 236 which may be aligned to a central axis of the threaded retaining spindle 114. FIG. 4B is a cross-sectional view of the view of FIG. 4A defined by a cut plane extending through the center of the assembly 236 (e.g., across axis A1). The cross-sectional views illustrated in FIGS. 6-12 may defined by similar cut planes.

Figure 4C:
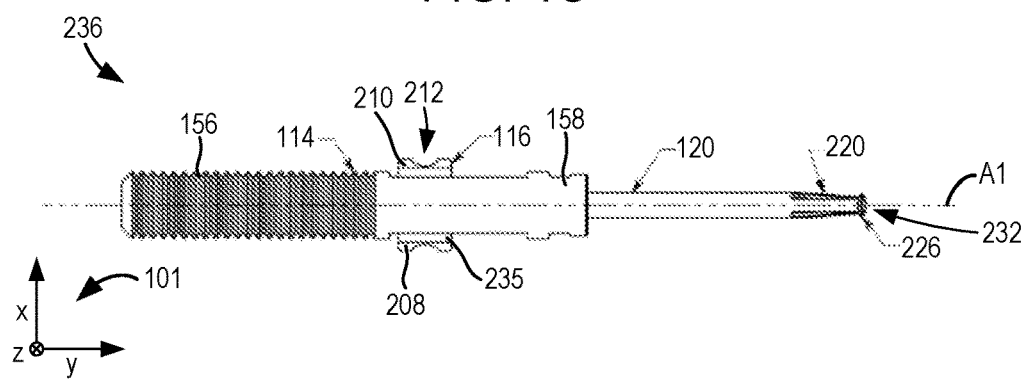
FIG. 4C is a view of the assembled components of FIG. 4A rotated 90-degrees.

Continuing with FIGS. 4A, 4B, 5A, and 5B, as previously described, the interior spindle 118 may be inserted within the assembly 236 so that the first end 238 may be located within an opening 404 of the threaded retaining spindle 114 and the second end 240 may be located within the unthreaded collet 120. After being linked to the block 116, the interior spindle 118 may axially translate within the threaded retaining spindle 114 (e.g., move back and forth through the first slot 160, the second slot 162, and the opening 404 along the y-axis) as well as into and out of the unthreaded collet 120 (e.g., via the central slot 232) as the block 116 axially translates within the first slot 160. FIG. 4C is a 90 degree rotated view of the view of FIG. 4A along the axis A1. As previously described, after lateral insertion of the block 116 into the threaded retaining spindle 114, the beveled sides of the block 116 as well as a portion of the side surface 234 and the side surface 235 may protrude from the first slot 160 along the z-axis. The protruding parts of the block 116 may prevent the assembly 236 from rotating within the center section 122 of the fastener 102 as further described with respect to FIGS. 5A and 5B.

Figure 4D:
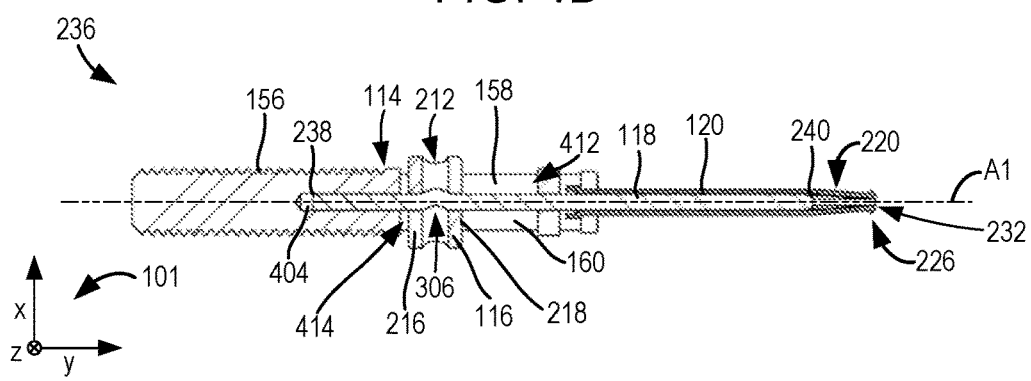
FIG. 4D is a cross-sectional view of the components depicted in FIG. 4C.

FIG. 4D is a cross-sectional view of the view of FIG. 4C taken at the center of the assembly 236 (e.g., across axis A1). As previously described, the deformed portion 306 that may axially link the interior spindle 118 to the block 116 may reside between the third side 216 and the fourth side 218 of the block 116. The block 116 may axially translate back and forth within the first slot 160. For example, the block 116 may slide back so that the third side 216 may be adjacent to a proximal side 414 of the first slot 160. When the third side 216 is adjacent to the proximal side 414, the first end 238 of the interior spindle 118 may be within the opening 404 of the threaded retaining spindle 114 and the second end 240 may be housed within the unthreaded collet 120. In another example, the block 116 may slide forward where the fourth side 218 may be adjacent to a distal side 412 of the first slot 160. When the fourth side 218 is adjacent to the distal side 412, the first end 238 of the interior spindle 118 may still remain within the opening 404 but the first end 238 may be closer in proximity to the first slot 160 than when the block 116 is in contact with the proximal side 414. Further, when the fourth side 218 of the block 116 is adjacent to the distal side 412, the second end 240 of the interior spindle 118 may be outside the unthreaded collet 120 (e.g., the second end 240 may protrude from the unthreaded collet 120 through the central slot 232). The block 116 may axially translate within the first slot 160 between the proximal side 414 and the distal side 412, with the position and movement of the interior spindle 118 linked to that of the block 116. Once the interior spindle 118 has been axially linked to the block 116, the assembly 236 may be inserted into the body of the fastener 102 as further described with respect to FIGS. 5A and 5B.

FIG. 5A shows a side perspective view of the assembly 236 partially inserted into the center section 122 of the fastener 102. As previously mentioned the center section 122 may include the interior cavity 504. An inner surface 502 of the center section 122 that may define the interior cavity 504 may be shaped with anti-rotation features that may prevent rotation of the assembly 236 and the second end cap 126 after insertion into the center section 122. In some embodiments, the inner surface 502 may be hexagonally shaped where the corners of the inner surface 502 may be complementary to the beveled sides of the block 116. However, other polygonal shapes of the inner surface have been envisioned. The interior cavity 504 may be of suitable dimensions to accommodate insertion of the assembly 236 through the second end 142 (e.g., along the y-axis) of the center section 122. During and/or after insertion, the beveled sides (e.g., first side 208 and second side 210) of the block 116 may be mated with the inner surface 502.

FIG. 5B shows a cross-sectional view of a portion of the assembly 236 shown in FIG. 5A, as defined by a lateral cut taken along dashed line 5B-5B, illustrated in FIG. 5A. Specifically, as shown in FIG. 5B, the first side 208 and the second side 210 of the block 116 may be adjacent to two opposing corners of the hexagonally-shaped inner surface 502 of the center section 122 after and/or during insertion of the assembly 236 into the center section 122. As previously described, the side surface 234 and the third side 216 (e.g., bottom surface) of the block 116 may be adjacent to the inner surfaces of the first slot 160 of the threaded retaining spindle 114 after lateral (e.g., parallel to the z-axis) insertion. Thus, the external profile of the block 116 interacts with the first slot 160 to provide anti-rotation functionality while allowing for axial translation between the block 116 and the threaded retaining spindle 114. The block 116 may first be confined to axial translation without rotation within the first slot 160 and secondly confined to axial translation without rotation within the body of the fastener 102. In doing so, the cooperation of the block 116, body (e.g., an assembly of the center section 122, the first end cap 104, and the second end cap 126), and threaded retaining spindle 114 may create a double axial translation without the possibility of rotation, as further described below.

Turning now to FIG. 6, a cross-sectional side view of the fully assembled fastener 102 is illustrated. As previously described, a body 620 of the fastener 102 may include the center section 122, the first end cap 104, and the second end cap 126. The body 620 may surround and maintain the position of the inner components of the fastener 102. An outer surface of the tubed portion 144 of the second end cap 126 may be complementary in shape and dimensions to the inner surface 502 of the center section 122. After insertion of the second end cap 126 into the second section 154 at the second end 142 of the center section 122, the outer surface of the tubed portion 144 may be in face-sharing contact with the inner surface 502 and the outer edges of the top 146 of the second end cap 126 may be in flush, face-sharing contact with the second end 142. The top 146 may include an aperture 602 which may accommodate the diameter of the shank 168 of the unthreaded collet 120. The shank 168 may extend away from the body 620 of the fastener 102 parallel to the y-axis and aligned to the central axis of the fastener 102. The unthreaded collet 120 may be radially constrained by the threaded retaining spindle 114 at the boundary of the enlarged head 164 within the second slot 162.

The free-spin spring 124 may be positioned around the shank 168 adjacent to the enlarged head 164 within the second slot 162. The free-spin spring 124 may be adjacent to the first face 166 of the threaded retaining spindle 114 (e.g., located on the non-threaded portion 158) and a bottom surface 612 of the top 146 of the second end cap 126. The block 116 may be located within the first slot 160 of the threaded retaining spindle 114 and engage with the inner surface 502 of the center section 122 of the body 620 of the fastener 102, as previously described. The block 116 may be axially linked to the interior spindle 118 and engage with the inner surface 502 of the center section 122 of the body 620. The interior spindle 118 may be aligned to the central axis of the fastener 102 and positioned within the unthreaded collet 120. The spreader spring 112 may surround the threaded portion 156 of the threaded retaining spindle 114 within the interior cavity 504 of the center section 122. Further, a distal end of the spreader spring 112 may, in certain configurations, push against portions of the fourth side 218 of the block 116 that protrude from the first slot 160 of the threaded retaining spindle 114. Further, the proximal end of the spreader spring 112 may cooperate with the drive nut 106.

The first section 152 of the center section 122 may be inserted into the first end cap 104 so that the first face 148 of the first end cap 104 is flush with the second section 154. Thus, the proximal end cap may be press fit into the center section, in one example, although other suitable attachment techniques (e.g., welding, mechanical attachment, etc.) between the components may be additionally or alternatively used in other examples. A second face 606 (e.g., opposite the first face 148) of the first end cap 104 may include an aperture 604. The aperture 604 may be shaped to accommodate the shaft 128 of the drive nut 106, where the shaft 128 may be rotated by an external force. For example, a user may rotate the shaft 128 using a tool 622 (e.g., a hex tool, a socket tool, a screw bit tool, etc.). In one example, the tool 622 may include memory 650 and a processor 652. In such an example, the tool may be configured to implement automated or partially automated tooling processes. However, in other examples, the tool 622 may be configured for manual operation. The drive nut 106 may be positioned within the fastener 102 where the section 132 of the drive nut 106 may be housed within the first end cap 104. The shaft 128 of the drive nut 106 may extend through the aperture 604, away (e.g., along the y-axis) from and out of the body 620 of the fastener 102 (e.g., the shaft 128 may be located outside of the fastener 102 and be perpendicular to the second face 606).

The first washer 108 may be positioned around the shaft 128 and located between the first surface 130 of the section 132 and a back surface 610 of the first end cap 104. The second washer 110 may be adjacent to the second face 134 on the section 132 and the first end 140 of the center section 122. An inner interior portion 618 of the drive nut 106 may include a first inner non-threaded region 614, a second inner non-threaded region 616, and an inner threaded region 608 located in between the two inner non-threaded regions.

The first inner non-threaded region 614 may span a portion of and be located at the end of the shaft 128. The inner non-threaded region 614 may be shaped to receive a driver of the tool that may be used to rotate the drive nut 106. Additionally, the drive nut 106 may be configured to receive tooling such as a wrench or socket. Further, the outside of the main body 620 and/or the outside of the end cap 104 may also be configured to receive tooling such as a wrench. The inner threaded region 608 may extend down the length of the shaft 128 and terminate within the section 132 of the drive nut 106. The second inner non-threaded region 616 of the drive nut 106 may span the remaining interior portion 618 within the section 132. However, other arrangements of the drive nut sections have been envisioned. The tool 622 may be inserted, manually or via automation, into an end 630 of the drive nut 106, where the tool 622 mates with the first inner non-threaded region 614 so that torque may be transferred from the tool 622 to the drive nut 106.

The length of the interior portion 618 of the drive nut 106 accommodates the length of the threaded portion 156 of the threaded retaining spindle 114, in one example. In other examples, the threaded retaining spindle may be sized so that it protrudes past the end of 106 when in use. Specifically, the inner threaded region 608 of the drive nut 106 may engage part of the threaded portion 156 of the threaded retaining spindle 114. Thus, the drive nut 106 may be threadingly engaged with the threaded retaining spindle 114. Additionally, in one example, the threaded portion 156 may pass through the second washer 110 and into the inner threaded region 608 through the second face 134 of the section 132. The washers may aid in the promotion of a smooth feel while using the fastener. However, in other examples, the washers may be omitted from the fastener.

As previously discussed, the block 116 may be fixedly coupled to the interior spindle 118 and mated within the threaded retaining spindle 114 which may be coupled to the unthreaded collet 120. Additionally, the body 620 of the fastener 102 may circumferentially surround the block 116 and the threaded retaining spindle 114. In this configuration, the block 116, the body 620, and the threaded retaining spindle 114 are designed to axially translate with regard to one another but are substantially prevented from rotation with regard to one another, during different clamping stages. To elaborate, in one example, rotation of the drive nut 106 in a first direction 626 (e.g., clamping direction) causes axial translation of the threaded retaining spindle 114 upward (indicated via arrow 628) while the block 116 remains substantially stationary as the urging of the spreader spring pushes the block down against 126 even though the threaded retaining spindle (114) axially travels towards the proximal end. and rotation between the components is substantially inhibited. As the threaded retaining spindle 114 and coupled unthreaded collet 120 move upward into the body 620, and while the temporarily stationary block and fixedly attached to 118, the first end 238 (e.g., the distal end) of the interior spindle 118 interacts with the plurality of flexible legs of the unthreaded collet 120 to push the legs radially outward into a clamping configuration. The fastener is capable of achieving this functionality because the spreader spring may be powerful enough to hold the block and corresponding spindles (e.g., spindle 118) in place while the threaded retaining spindle and linked collet axially travel to the point that the fingers open on the collet. In other words, the spreader spring may overcome the axial force demanded to pull the closed fingers of the collet over the spindle 118 and open the fingers. Once the fingers are open, the slot in spindle 114 may be sized so that the block hits the end of the slot in spindle 114. At this point, the spring is incapable of overcoming the threaded action of the spindle 114 and the drive nut and compresses while the threaded retaining spindle and attached collet and joined block/spindle (where the block now resides at bottom of slot in the spindle 114) all travel axially toward the proximal end as the threading action continues.

After this initial phase, additional rotation of the drive nut 106 in the clamping direction causes both the interior spindle 118 and the unthreaded collet 120 to axially translate upward into the body 620 while rotation between the body 620 and the block 116 is again, substantially inhibited. This functionality may be achieved because the spreader spring 112 may be powerful enough to hold the block and corresponding spindles in place while the threaded retaining spindle 114 and linked collet axially travel to the point that the fingers open on the collet. Thus, the spreader spring overcomes the axial force demanded to pull the closed fingers of the collet over the spindle 118 and open the fingers. Once the fingers are open, the slot in spindle 114 may be sized so that the block hits the end of the slot in the spindle 114. At this point, the spring 112 may have no chance to overcome the threaded action of the threaded retaining spindle and the drive nut and simply compresses while the threaded retaining spindle and attached collet and joined block all travel axially toward the proximal end as the threading action continues. The axial translation of the interior spindle and the unthreaded collet continues until the block (previously held axially stationary at the urging of the spreader spring even though 114 was axially translating toward the proximal end) reaches the distal end of the slot in 114 and now axially translates toward the proximal end along with spindle 114. As such, once the block has reached the end of the slot in 114 and begins axially translating with spindle 114, the spreader spring begins to compress. Additionally, since the block is axially traveling with the spindle 114 then the spindle 118, which is fixedly attached to the block, also axially translates with the block. In this way, once the fastener 102 has placed the collet's feet into a clamped configuration, the 114, block, 118 (attached to the block), and collet are all axially drawn into the body 620 enabling the fastener's overall length to be decreased as the grip length decreases. The fastener 102 can therefore achieve greater compactness during clamping. The different sequences of clamping and unclamping action in the fastener 102 are elaborated upon below.

FIGS. 7-12 show different configurations of the assembled fastener 102 prior to and/or during use and will be described collectively, with the described components and features labeled within the figures. FIGS. 7 and 10 depict the fastener 102 in a "ready to install" configuration, with FIG. 7 showing a cross-sectional top view of this position and FIG. 10 showing a cross-sectional side view. In the "ready to install" position, the unthreaded collet 120 may be urged to axially translate in tandem with the threaded retaining spindle 114 via the cooperation of the enlarged head 164 within the second slot 162 of the threaded retaining spindle 114, with the second slot 162 primarily securing the unthreaded collet 120 in an axial direction. The cooperation of the enlarged head 164 within the second slot 162 may carry/transfer the axial load and also position the unthreaded collet 120 axially at a desired location. The unthreaded collet 120 may be partially radially constrained to the threaded retaining spindle 114 at the boundary of the enlarged head 164 and diameter of the shank 168 within the second slot 162. Further, the interior spindle 118 may simultaneously reside within the threaded retaining spindle 114, the block 116, and the unthreaded collet 120, with the interior spindle 118 fixedly attached to the block 116. Thus, the unthreaded collet 120 may be radially constrained directions (e.g., in all directions) perpendicular to the long axis (e.g., parallel to the y-axis) of the fastener 102 via cooperation of these parts.

The fixed attachment of the interior spindle 118 to the block 116 may radially locate the block 116 to the central axis of the threaded retaining spindle 114 and within the first slot 160. Thus, the block 116 may be radially located within the threaded retaining spindle 114 and may axially translate within the first slot 160 while remaining centered (e.g., the block 116 may axially translate within the first slot 160 without rotation). Thus, the interior spindle 118 and the block 116 may axially translate as a unit, while the interior spindle 118 retains the ability to axially translate within the other aforementioned components (e.g., the interior spindle 118 may still axially translate within the unthreaded collet 120 and into the opening 404 of the threaded retaining spindle 114 with the block 116 in tow). In some embodiments, a lip 700 may be introduced toward the distal end of the body 620 that may substantially prevent the block 116 and the interior spindle 118 from axially translating beyond the lip 700. For example, the lip 700 may be created by the boundary formed between a mechanically bound end of the tubed portion 144 of the second end cap 126 to the center section 122 of the body 620. The spreader spring 112 may push against the fourth side 218 of the block 116 so that the block 116 and the interior spindle 118 may be held against the lip 700.

The drive nut 106 may be rotated in a loosening direction where a proximal end 802 of the threaded retaining spindle 114 may be expelled from the inner threaded region 608 of the drive nut 106 which, in turn, may cause the free-spin spring 124 to be compressed. Compression of the free-spin spring 124 may result in a return spring force that persistently urges the proximal end 802 to remain in contact with the threads of the inner threaded region 608 of the drive nut 106. Further, the interior spindle 118 may be positioned within the unthreaded collet 120 such that the plurality of flexible legs 220 are in a closed position (as previously described with respect to FIG. 2). Once the fastener 102 is in the "ready to install" position, it may transition to a "ready to clamp" configuration as shown in FIGS. 8 and 11. FIG. 8 is a cross-sectional view of the "ready to clamp" configuration and FIG. 11 is a cross-sectional side view of the "ready to clamp" configuration.

To transition to the "ready to clamp" configuration, rotation of the drive nut 106 may be changed to a tightening direction (e.g., opposite the loosening direction). As the drive nut 106 rotates, threads within the inner threaded region 608 may re-engage with the threaded portion 156 of the threaded retaining spindle 114, with the compressed free-spin spring 124 urging the end 702 of the threaded retaining spindle 114 into the section 132 of the drive nut 106. Thus, as rotation continues, the threaded portion 156 may be drawn into the drive nut 106 without rotating the threaded retaining spindle 114. Further, as the threaded retaining spindle 114 is drawn into the drive nut 106, the first slot 160 and the unthreaded collet 120 may be simultaneously drawn toward the end 802 of the fastener 102, without the unthreaded collet 120 undergoing rotation. The axial motion of the threaded retaining spindle 114 toward the end 802 of the fastener 102 may occur as the spreader spring 112 pushes against the fourth side 218 of the block 116. The spring force exerted by the spreader spring 112 may hold the block 116 and interior spindle 118 at a stationary position against the lip 700 as the threaded retaining spindle 114 is drawn into the drive nut 106. The spreader spring 112 may be continually compressed between the drive nut 106 and the block 116 as the threaded retaining spindle 114 is drawn into the drive nut 106. Concurrently, compression of the free-spin spring 124 may decrease (e.g., the free-spin spring 124 may expand) as the drive nut is tightened. The relative motion of the threaded retaining spindle 114 past the block 116 may be facilitated via the sizing and position of the first slot 160 and the cooperation of the first slot 160 with respect to the block 116. As the threaded retaining spindle 114 and unthreaded collet 120 axially translate with drive nut 106 tightening, the block 116 (being held against the lip 700) may come into closer proximity with a distal end 624 of the first slot 160, as the side surfaces of the block 116 cooperate with the adjacent inner surfaces of the first slot 160. For example, the inner surfaces of the first slot 160 may include grooves or threads complimentary to grooves or threads located on the side surfaces of the block 116 thereby facilitating cooperation of the block 116 within the first slot 160.

The relative motion of the threaded retaining spindle 114 and the unthreaded collet 120, with respect to the temporarily fixed block 116 and interior spindle 118, may result in a distal end 806 of the unthreaded collet 120 being drawn closer and closer to the second end 240 of the interior spindle 118. As the two ends are drawn into closer proximity, the interior spindle 118 may cause the plurality of flexible legs 220 to shift from a closed position to an open position. Thus, after insertion and activation of the fastener 102, the interior spindle 118 may serve to keep the plurality of flexible legs 220 open during clamping as the clamping force itself may urge the plurality of flexible legs 220 to close should the distal end of the interior spindle 118 not be positioned within the plurality of flexible legs 220. Further, as the second end 240 of the interior spindle 118 is drawn toward the distal end 806 of the unthreaded collet 120, the first end 238 of the interior spindle 118 may be drawn away from the opening 404 (e.g., the interior spindle 118 may occupy the opening 404 to a lesser degree than when the fastener 102 is in a "ready to clamp" configuration as shown in FIGS. 7 and 10).

Further rotation of the drive nut 106 in the tightening direction may bring the fastener 102 into a "clamped" configuration as depicted in FIGS. 9 and 12. FIG. 9 is a cross-sectional view of the "clamped" configuration and FIG. 12 is a cross-sectional side view of the "clamped" configuration. As the drive nut 106 is tightened, the threaded retaining spindle 114 and the unthreaded collet 120 may be drawn further toward the proximal end 802 of the fastener 102 as it transitions to the "clamped" configuration. As the unthreaded collet 120 is drawn toward the proximal end 802 of the fastener 102, the distal end 806 of the unthreaded collet 120 may come into closer proximity to the second end cap 126 of the body 620 as well as the second end 240 of the interior spindle 118 as the block 116 and the interior spindle 118 are held in position (e.g., via the spring force of the spreader spring 112 and the lip 700). These combined actions may continue as the drive nut 106 is tightened until the second end 240 of the interior spindle 118 protrudes past the distal end 806 of the unthreaded collet 120 and, in doing so, may mechanically assure that the plurality of flexible legs 220 are in an open expanded (e.g., fully expanded) position, in one embodiment.

Further, the first slot 160 may be sized and positioned so that when the plurality of flexible legs 220 are held in an open position via the interior spindle 118 via the aforementioned sequence of events, the distal end 624 of the first slot 160 may begin to cooperate with (e.g., solid contact may occur between) the third side 216 of the block 116. Further tightening of the drive nut 106 may continue to draw the threaded retaining spindle 114 via threading action toward the proximal end 802 of the fastener 102 as well as the now mechanically bound first slot 160. As such, the block 116 may be forcibly drawn toward the proximal end 802 of the fastener 102 (e.g., the block 116 may axially translate without rotation) via the threading action between the drive nut 106 and threaded portion 156 of the threaded retaining spindle 114. The threading action may overcome the resistance of the partially compressed spreader spring 112 and further compress the spreader spring 112. As such, the threaded retaining spindle 114, unthreaded collet 120, block 116, and interior spindle 118 may act as a single unit via their respective cooperating features as they are drawn toward the proximal end 802 of the fastener 102 via tightening of the drive nut 106.

As tightening continues, the unthreaded collet 120 (with the plurality of flexible legs 220 in an open/expanded (e.g., fully expanded) position), the threaded retaining spindle 114, block 116, and interior spindle 118 may axially travel in tandem toward the proximal end 802 of the fastener 102, so that the fastener 102 may impart a threadably driven clamping action to the objects to be clamped via the tightening torque applied to the drive nut 106. In this way, rotation of the drive nut in one direction induces axial translation of the threaded retaining spindle in relation to the block and radial expansion of the clamping feet outward.

Further, after the fastener 102 is in the "clamped" configuration, the fastener 102 may be returned to the "ready to install" configuration by rotating the drive nut 106 in the loosening direction which may reverse the sequence of events described above. Thus, the fastener 102 may be used as a temporary fastener. Additionally, it will be appreciated, that in the configuration described herein, the fastener 102 may apply clamping forces to workpieces with a wide variety of thicknesses.

By transitioning between the different configurations described with respect to FIGS. 7-12, the fastener 102 may be used to fasten at least two objects together as shown in FIGS. 13A and 13B. FIG. 13A is a side view of the fastener 102 in a "ready to install" configuration (e.g., as previously described with respect to FIGS. 7 and 10). The collet 120 of the fastener 102 may be inserted through a front face 1306 into a blind hole 1314 traversing a first object 1302. The blind hole 1314 may be complementary in shape (e.g., circular) and dimensions to accommodate the outer diameter of the collet 120, in some instances. Further, in some examples, the blind hole 1314 may be a drilled hole that traverses the first object 1302 so that, after insertion, a tip 1310 of the collet 120 may exit a back face 1312 of the first object 1302. The tip 1310 may include the plurality of flexible legs 220 attached to the plurality of clamping feet 226 as previously described (see FIG. 2). After passing through the first object 1302, the tip 1310 of the collet 120 may be further inserted through a front face 1308 of a second object 1304 into a through-hole 1316.

The blind hole 1314 and the through-hole 1316 may be aligned to one another as well as the central axis, as may be defined by axis A1, of the fastener 102 after the collet 120 has been inserted into both objects. After collet 120 insertion, the drive nut 106 of the fastener 102 may be rotated in a tightening direction thereby transitioning the fastener 102 from the "ready to install" configuration to the "ready to clamp" configuration as previously described with respect to FIGS. 8 and 11. As the drive nut 106 is tightened, the tip 1310 of the collet 120 may expand within the second object 1304 as the second end 240 of the interior spindle 118 is drawn to and through the tip 1310. As the interior spindle 118 is drawn toward the tip 1310, the second end 240 may force the plurality of flexible legs 220 from the closed position to the open position. As the plurality of flexible legs 220 transition from closed to open (e.g., the plurality of clamping feet 226 are forced radially outward), the tip 1310 may become secured within and to the through-hole 1316 as shown in FIG. 13B. In some examples, the interior spindle 118 may be configured such that the plurality of flexible legs 220 may be closed upon insertion of the fastener 102 into a hole at the impetus of the hole itself. As such, after fastener insertion and transition to the "ready to clamp" configuration, the interior spindle 118 would serve to keep the legs open during clamping as the clamping force itself would urge the legs to close should there be no the interior spindle 118.

FIG. 13B is a side view of the fastener 102 in a "clamped" configuration as described with respect to FIGS. 9 and 12. After the tip 1310 is secured to the through-hole 1316 of the second object 1304, continual tightening of the drive nut 106 will draw the first object 1302 and the second object 1304 into closer and closer proximity to the distal end of the fastener 102 as the threaded retaining spindle 114 to which the collet 120 is coupled is drawn into the drive nut 106. The drive nut 106 may be tightened until applied torque no longer rotates the drive nut 106 and the first object 1302 is fastened (e.g., securely joined) to the second object 1304.

FIG. 14 shows a method 1400 for operating a fastener. The method may be implemented by any of the fasteners or combinations of the fasteners described above with regard to FIGS. 1-13. However, in other examples, the method may be implemented by other suitable fasteners. It will be appreciated that the method 1400 may be at least implemented in part via an automated process. As such, the method steps may be stored as instructions in non-transitory memory that when executed by the processor cause a controller to implement the method steps. It will be understood that the memory and processor may be included in hardware of a tooling apparatus. It will also be appreciated that the automated tooling apparatus may further include tooling attachments, arms, carriages, drivers, etc., for manipulating the fastener. However, at least some of the steps, in some examples, may be implemented via manufacturing personnel manually operating tooling apparatuses. The fastener may include a block fixedly coupled to an interior spindle and mated with a slot in a threaded retaining spindle, a drive nut engaged with the threaded retaining spindle, an unthreaded collet coupled to the threaded retaining spindle and including a plurality of flexible legs each including a clamping foot, and a body circumferentially surrounding the block and the threaded retaining spindle. The block, the body, and the threaded retaining spindle of the fastener are configured to axially translate with regard to one another and are substantially prevented from rotation with regard to one another.

At 1402, the fastener's collet is inserted into objects slated for clamping. Inserting the fastener's collet into the objects may include steps 1404 and 1406. At 1404, the distal end of the collet is inserted through a hole in a first object and at 1406 the distal end of the collet is inserted through a hole in a second object. It will be understood that in other embodiments, the collet may be inserted through additional workpieces slated for clamping. In one example, the collet's legs may be bent inward in an unclamped configuration during insertion through the workpieces. However, in another example, the plurality of flexible legs on the collet may be designed such that they remain in a clamped configuration even when the center spindle is not forcing their expansion. Therefore, in such an example, the collet legs may be bent inward into the unclamped configuration when they are inserted through the workpiece openings. As such, after fastener insertion, the interior spindle would serve to keep the legs open during clamping as the clamping force itself would urge the legs to close should there be no the interior spindle. It will be understood that the holes in the objects may be of suitable dimensions to accommodate the outer diameter of the shank of the collet.

At 1408, the fastener is transitioned into a clamped configuration. Transitioning the fastener into the clamped configuration may include steps 1410 and 1412. These steps may be referred to as a first clamping stage and a second clamping stage. At 1410, the method includes rotating the drive nut in a clamping direction to place the collet legs in a clamped configuration. As the drive nut is rotated, the threaded retaining spindle becomes threadingly engaged with the drive nut thereby drawing the threaded retaining spindle, as well as the unthreaded collet, toward the proximal end and upward into the body of the fastener. In the first clamping stage, as the threaded retaining spindle and the unthreaded collet are drawn toward the proximal end of the body, the block and the interior spindle fixedly coupled to the block may be remain in a substantially fixed position with regard to the fastener body. In some embodiments, the block and the interior spindle may be held in position via a spring force exerted on the block (e.g., the spring force of the spreader spring 112 as described with respect to FIGS. 8-12) or a combination of spring force and lips within the body of the fastener (e.g., the block may be pressed against a lip via an exerted spring force thereby holding the block at a relative position within the fastener). These combined actions may continue as the drive nut is tightened until the distal end of the interior spindle protrudes past the distal end of the unthreaded collet and, in doing so, may mechanically assure that the plurality of flexible legs are in an open/expanded position. In this way, the plurality of flexible legs in the collet transition to a clamping configuration (e.g., pushed radially outward by the interior spindle).

At 1412, the method 1400 further includes, rotating the drive nut in the clamping direction to induce axial translation of the threaded retaining spindle, collet, block, and interior spindle in unison into the fastener body. The drive nut may be continually rotated, thereby drawing the threaded retaining spindle and the unthreaded collet further toward the proximal end of the fastener as it transitions to a "clamped" configuration. As the threaded retaining spindle axially translates and is drawn into the drive nut via threading action, the block may come into closer and closer proximity with a distal end of the slot. The surfaces of the block mated with the slot may cooperate (e.g., the interacting surfaces of the block and the slot may have complimentary grooves or threads) so that the block (positioned within the body by an exerted spring force and a lip or lips) may remain in a stationary position relative to the movement of the threaded retaining spindle. Thus, the slot may axially delimit the block as the threaded retaining spindle axially translates so that the block may remain at a desired radial position but the position of the block is not set within the fastener. Once the drive nut has been rotated so that the block is adjacent to the distal end of the slot, further rotation may result further axially translation of the threaded retaining spindle and the unthreaded collet upward, where the grip length of the fastener is decreased. During this second stage, the clamping feet in the collet legs are brought closer to the workpieces. Drive nut rotation may be discontinued when a desired clamping force is exerted on the workpieces via the fastener.

At 1414, the fastener may be unclamped by rotating the drive nut in an unclamping direction (e.g., a direction opposite the clamping direction). Unclamping the fastener may include, at 1416, rotating the drive nut in an unclamping direction to induce axial translation of the threaded retaining spindle, collet, block, and interior spindle in unison away from the fastener body. As the drive nut is rotated, the sequence of events described with respect to step 1408 may be reversed. The threaded retaining spindle and unthreaded collet may translate away from the body thereby increasing the fastener's grip length as the drive nut is rotated. Unclamping the fastener may further include, at 1418, rotating the drive in the unclamping direction to place the collet legs in an unclamped configuration. In this second unclamping stage, as the threaded retaining spindle is drawn out of the drive nut with rotation, the threaded retaining spindle and unthreaded collet axially translate away from the block. Thus, as the interior spindle is fixedly coupled to the block, the distal end of the unthreaded collet may move away from the distal end of the interior spindle so that the plurality of flexible legs may radially retract (e.g., the distal end of the interior spindle is no longer mechanically forcing the legs outward).

Unclamping the fastener may further include, at 1420, rotating the drive nut in the unclamping direction such that the drive nut freely spins in relation to the threaded retaining spindle. In this way, additional rotation in the unclamping direction threadingly decouples the threaded retaining spindle from the drive nut so that the drive nut may freely spin when torque is applied in the unclamping direction. However, when the fastener is in the free-spin configuration, the threaded retaining spindle may compress a free-spin spring within the fastener located adjacent to the distal end of the threaded retaining spindle. Compression of the free-spin spring may result in a spring force being exerted on the distal end of the threaded retaining spindle that urges the proximal end into the drive nut. Thus, when the drive nut is again rotated in a clamping direction, the threaded retaining spindle may re-engage with the drive nut. In this way, the fastener may be efficiently transitioned back to the clamping configuration. After step 1414, method 1400 may end.

FIGS. 1-13B are drawn approximately to scale, however other relative dimensions may be used in other embodiments. FIGS. 1-13B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with a space there-between and no other components may be referred to as such, in at least one example. As yet another example, elements shown at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a central axis of the figures and used to describe positioning of elements of the figures relative to one another. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The invention will further be described in the following paragraphs. In one aspect, a fastener is provided that comprises a block fixedly coupled to an interior spindle and mated with a slot in a threaded retaining spindle; a drive nut engaged with the threaded retaining spindle; an unthreaded collet coupled to the threaded retaining spindle and including a plurality of flexible legs each including a clamping foot; and a body circumferentially surrounding the block and the threaded retaining spindle; where the block, the body, and the threaded retaining spindle are configured to axially translate in relation to one another and are substantially prevented from rotation in relation to one another, during different stages of fastener operation.

In another aspect, a method for operating a fastener is provided that comprises rotating a drive nut in a first direction to induce fastener clamping where a plurality of flexible legs of an unthreaded collet are spread apart, the plurality of flexible legs each include a clamping foot at a distal end; rotating the drive nut in a second direction opposite the first direction, to induce fastener unclamping where the plurality of flexible legs of the unthreaded collet radially converge; where the drive nut threadingly engages with a threaded retaining spindle; where the fastener includes a block fixedly coupled to an interior spindle and mated with a slot in the threaded retaining spindle.

In yet another aspect, a fastener is provided which comprises a block fixedly coupled to an interior spindle and mated with a slot in a threaded retaining spindle; a drive nut engaged with the threaded retaining spindle; an unthreaded collet coupled to the threaded retaining spindle and including a plurality of flexible legs each including a clamping foot; and a body mating with the threaded retaining spindle to allow axial translation and inhibit rotation between the body and the threaded retaining spindle; where the unthreaded collet includes a head axially retained in a lateral slot in the threaded retaining spindle; where the block, the body, and the threaded retaining spindle are configured to axially translate in relation to one another and substantially prevented from rotation in relation to one another, during different stages of fastener operation.

In any of the aspects or combinations of the aspects, during a first clamping stage, rotation of the drive nut in a first direction may induce axial translation of the threaded retaining spindle in relation to the block and radial expansion of the clamping feet outward; and where, during a second clamping stage, rotation of the drive nut in the first direction may induce the block and threaded retaining spindle to axially translate into the body in unison.

In any of the aspects or combinations of the aspects, rotation of the drive nut in a second direction, opposite the first direction, during a first unclamping stage, may include the block and threaded retaining spindle to axially translate away from the body in unison; and where, during a second unclamping stage, rotation of the drive nut in the second direction may include axial translation of the threaded retaining spindle in relation to the block and radial contraction of the clamping feet inward.

In any of the aspects or combinations of the aspects, the block may include a lateral access slot having a deformed section of the interior spindle positioned therein.

In any of the aspects or combinations of the aspects, the unthreaded collet may include a head axially retained in a lateral slot in the threaded retaining spindle.

In any of the aspects or combinations of the aspects, the block may include two opposing planar faces.

In any of the aspects or combinations of the aspects, the fastener may further comprise a spring axially positioned between the drive nut and the block.

In any of the aspects or combinations of the aspects, the fastener may further comprise a free-spin spring axially positioned between the threaded retaining spindle and a cap mated with a distal end of the body.

In any of the aspects or combinations of the aspects, the fastener may further comprise a proximal end cap coupled to the body.

In any of the aspects or combinations of the aspects, the fastener may further comprise a distal end cap coupled to the body.

In any of the aspects or combinations of the aspects, where rotating the drive nut in a first direction may include: during a first stage of clamping, rotating the drive nut in the first direction to induce axial translation of the threaded retaining spindle in relation to the block and radial expansion of the clamping feet outward; and during a second clamping stage, rotating the drive nut in the first direction to induce axial translation of the block and threaded retaining spindle into the body in unison.

In any of the aspects or combinations of the aspects, the method may further comprise, in a free-spin configuration, rotating the drive nut in the second direction while the threaded retaining spindle remains stationary.

In any of the aspects or combinations of the aspects, the method may further comprise transitioning from the free-spin configuration to an engaged-configuration using an axial force generate by a free-spin spring and exerted on the threaded retaining spindle.

In any of the aspects or combinations of the aspects, where the unthreaded collet may include a head axially retained in a lateral slot in the threaded retaining spindle and where the block includes two opposing planar faces.

In any of the aspects or combinations of the aspects, the block may include two opposing planar faces.

In any of the aspects or combinations of the aspects, the fastener may further comprise a spring axially delimited by the drive nut and the block and circumferentially enclosed by the body.

In any of the aspects or combinations of the aspects, the fastener may further comprise a free-spin spring axially positioned between the threaded retaining spindle and a cap mated with a distal end of the body.

In another representation,

Note that the example control and estimation routines included herein can be used with various fastener system configurations. The control methods and routines disclosed herein may be stored as executable instructions in non-transitory memory and may be carried out by a tooling apparatus.

The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the fastener system and/or tooling apparatus, where the described actions are carried out by executing the instructions in a tooling apparatus and fastener system including the various components.

It will be appreciated that the configurations and routines disclosed herein are exemplary in nature, and that these specific embodiments are not to be considered in a limiting sense, because numerous variations are possible. For example, the above technology can be applied to a broad range of manufacturing fields such as the aerospace industry, the construction industry, the maritime industry, etc. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A fastener comprising:
    a block fixedly coupled to an interior spindle and mated with a slot in a threaded retaining spindle;
    a drive nut engaged with the threaded retaining spindle;
    an unthreaded collet coupled to the threaded retaining spindle and including a plurality of flexible legs each including a clamping foot; and
    a body circumferentially surrounding the block and the threaded retaining spindle;
    wherein the block, the body, and the threaded retaining spindle are configured to axially translate in relation to one another and are substantially prevented from rotation in relation to one another, during different stages of fastener operation.

2. The fastener of claim 1, wherein:
    during a first clamping stage, rotation of the drive nut in a first direction induces axial translation of the threaded retaining spindle in relation to the block and radial expansion of the clamping feet outward; and
    during a second clamping stage, rotation of the drive nut in the first direction induces the block and threaded retaining spindle to axially translate into the body in unison.

3. The fastener of claim 2, wherein:
    rotation of the drive nut in a second direction, opposite the first direction, during a first unclamping stage, induces the block and threaded retaining spindle to axially translate away from the body in unison; and during a second unclamping stage, rotation of the drive nut in the second direction induces axial translation of the threaded retaining spindle in relation to the block and radial contraction of the clamping feet inward.

4. The fastener of claim 1, wherein the block includes a lateral access slot having a deformed section of the interior spindle positioned therein.

5. The fastener of claim 1, wherein the unthreaded collet includes a head axially retained in a lateral slot in the threaded retaining spindle.

6. The fastener of claim 1, wherein the block includes two opposing planar faces.

7. The fastener of claim 1, further comprising a spring axially positioned between the drive nut and the block.

8. The fastener of claim 1, further comprising a free-spin spring axially positioned between the threaded retaining spindle and a cap mated with a distal end of the body.

9. The fastener of claim 1, further comprising an end cap coupled to the body.

10. The fastener of claim 1, further comprising a distal end cap coupled to the body.

11. A method for operating a fastener, comprising:

rotating a drive nut in a first direction to induce fastener clamping wherein a plurality of flexible legs of an unthreaded collet are spread apart, the plurality of flexible legs each include a clamping foot at a distal end;

rotating the drive nut in a second direction opposite the first direction, to induce fastener unclamping wherein the plurality of flexible legs of the unthreaded collet radially converge; and in a free-spin configuration, rotating the drive nut in the second direction while the threaded retaining spindle remains stationary;

wherein the drive nut engages with a threaded retaining spindle; and wherein the fastener includes a block fixedly coupled to an interior spindle and mated with a slot in the threaded retaining spindle.

12. The method of claim 11, wherein rotating the drive nut in the first direction includes:

during a first stage of clamping, rotating the drive nut in the first direction to induce axial translation of the threaded retaining spindle in relation to the block and radial expansion of the clamping feet outward; and during a second clamping stage, rotating the drive nut in the first direction to induce axial translation of the block and threaded retaining spindle into a body in unison.

13. The method of claim 11, further comprising transitioning from the free-spin configuration to an engaged-configuration using an axial force generate by a free-spin spring and exerted on the threaded retaining spindle.

14. The method of claim 11, wherein the unthreaded collet includes a head axially retained in a lateral slot in the threaded retaining spindle and wherein the block includes two opposing planar faces.

15. A fastener comprising:

a block fixedly coupled to an interior spindle and mated with a slot in a threaded retaining spindle;

a drive nut engaged with the threaded retaining spindle;

an unthreaded collet coupled to the threaded retaining spindle and including a plurality of flexible legs each including a clamping foot; and a body mating with the threaded retaining spindle to allow axial translation and inhibit rotation between the body and the threaded retaining spindle;

wherein the unthreaded collet includes a head axially retained in a lateral slot in the threaded retaining spindle; and wherein the block, the body, and the threaded retaining spindle are configured to axially translate in relation to one another and substantially prevented from rotation in relation to one another, during different stages of fastener operation.

16. The fastener of claim 15, wherein the block includes two opposing planar faces.

17. The fastener of claim 16, further comprising a spring axially delimited by the drive nut and the block and circumferentially enclosed by the body.

18. The fastener of claim 15, further comprising a free-spin spring axially positioned between the threaded retaining spindle and a cap mated with a distal end of the body.

19. The fastener of claim 15, further comprising an end cap coupled to the body.

* * * * *